US008854635B2

(12) United States Patent
Mishima et al.

(10) Patent No.: US 8,854,635 B2
(45) Date of Patent: Oct. 7, 2014

(54) DOCUMENT PROCESSING DEVICE, METHOD, AND RECORDING MEDIUM FOR CREATING AND CORRECTING FORMATS FOR EXTRACTING CHARACTERS STRINGS

(75) Inventors: Nobuhiro Mishima, Yodogawa-ku (JP); Hidetaka Iwai, Itami (JP); Kazuo Inui, Itami (JP); Kaitaku Ozawa, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 780 days.

(21) Appl. No.: 12/842,160

(22) Filed: Jul. 23, 2010

(65) Prior Publication Data

US 2011/0032556 A1 Feb. 10, 2011

(30) Foreign Application Priority Data

Aug. 6, 2009 (JP) .................................. 2009-183445

(51) Int. Cl.
*G06F 3/12* (2006.01)
*G06K 15/00* (2006.01)
*G06K 9/00* (2006.01)
*G06F 17/30* (2006.01)

(52) U.S. Cl.
CPC ...... *G06F 17/30011* (2013.01); *G06K 9/00469* (2013.01)
USPC ....... 358/1.11; 358/1.13; 358/1.14; 358/1.15; 358/1.16; 358/1.18

(58) Field of Classification Search
CPC .......... G06K 9/00442; G06K 9/00463; G06K 9/00469; G06K 9/00483
See application file for complete search history.

(56) References Cited

U.S. PATENT DOCUMENTS

| 5,555,362 A | 9/1996 | Yamashita et al. |
| 2008/0201636 A1* | 8/2008 | Fujiwara ........................ 715/700 |
| 2010/0125807 A1* | 5/2010 | Easterday et al. ............ 715/785 |

FOREIGN PATENT DOCUMENTS

| JP | 03-252759 | 11/1991 |
| JP | 06-068300 | 3/1994 |
| JP | 2001-265762 | 9/2001 |
| JP | 2008-305088 A | 12/2008 |
| JP | 2008-305089 A | 12/2008 |
| JP | 2009026122 | * 2/2009 |

OTHER PUBLICATIONS

Machine translation of JP Pub 2008305088 to Komaki Yoshio.*

(Continued)

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A document processing device comprises: a document data acquiring part for acquiring document data; a character string extracting part for extracting character strings satisfying a predetermined condition for character string extraction from the document data acquired by the document data acquiring part; a format creating part for deriving the respective features of the character strings extracted by the character string extracting part, and for creating a format containing the derived features in the form of data; a display part on which the character strings extracted by the character string extracting part are displayed in a list form, and on which the format created by the format creating part is displayed; and a format correcting part for correcting the format displayed on the display part. The character string extracting part extracts character strings again to conform to the format corrected by the format correcting part.

20 Claims, 19 Drawing Sheets

(56) References Cited

OTHER PUBLICATIONS

Machine translation in english of JP Pub 2008305088 to Komaki Yoshio.*

Machine translation in english of JP Pub 2009026122 to Fujiwara Koji.*

Office Action dated Jul. 5, 2011, issued in the corresponding Japanese Patent Application No. 2009-183445, and an English Translation thereof.

* cited by examiner

DOCUMENT PROCESSING DEVICE, METHOD, AND RECORDING MEDIUM FOR CREATING AND CORRECTING FORMATS FOR EXTRACTING CHARACTERS STRINGS

This application is based on the application No. 2009-183445 filed in Japan, the contents of which are hereby incorporated by reference.

BACKGROUND OF THE INVENTION

1. Field of the Invention

The present invention relates to a document processing device, a document processing method, and a recording medium. The present invention more specifically relates to a technique of extracting character strings such as a heading from a document in electronic form.

2. Description of the Background Art

Image processing devices identified by names such as complex devices or MFPs (multifunction peripherals) are capable of converting document data acquired by scanning an original into a certain file format such as PDF (portable document format), and outputting the converted document data. For such data output, character strings such as a title and a heading of each chapter and each item contained in the document may be extracted, and the document data may be output with the extracted character strings added thereto as bookmark data. This enhances the convenience in the use of document data.

An example of such a conventional technique of automatically extracting character strings is disclosed in Japanese Patent Application Laid-Open No. JP 2008-305088 A. In this conventional technique, content regions such as character strings contained in a document are extracted by rows from an image of the document, and all the extracted content regions are classified into at least one group. Then, based on the respective positions of the content regions of each classified group in the document image, the suitability of the group as a bookmark is evaluated. Based on a result of the evaluation, at least one group is selected from a group has the highest level of suitability is selected as a group to be a target of generation of bookmark data. Thereafter, based on the attribute information of content regions of the selected group, bookmark data indicating the respective positions of the content regions of the selected group in the document image is generated. So, this conventional technique is capable of automatically extracting character strings such as headings contained in a document.

According to a conventional technique disclosed for example in Japanese Patent Application Laid-Open No. JP 2008-305089 A, generation of bookmark data allows a user to easily find the respective positions of document contents throughout the document and the respective types of the document contents.

In the above-described conventional techniques, character strings such as headings contained in a document are extracted under a predetermined condition. This may result in extraction of a character string that fails to satisfy a user. Correcting a condition under which character strings are extracted from document data is required in order to avoid extraction of the unintended character string. However, the conventional techniques fail to efficiently correct the condition.

An optimum condition differs for each type of document depending on its respective setting, such as a documentary form. At the same time, a user can freely make the setting of a document such as a documentary form, so it is difficult to define an optimum condition in advance that matches all documentary forms. For this reason, when a character string failing to satisfy a user is extracted as a bookmark, it is desirable that the condition is to be corrected with a relatively simple operation.

SUMMARY OF THE INVENTION

The present invention has been made to solve the above-described problems. An object of the present invention is to provide a document processing device, a document processing method, and a recording medium that are capable of efficiently correcting a character string failing to satisfy a user's intention that is extracted as a result of extraction of character strings such as headings from a document to be processed.

First, the present invention is directed to a document processing device. According to an aspect of the document processing device, the device comprises: a document data acquiring part for acquiring document data; a character string extracting part for extracting character strings satisfying a predetermined condition for character string extraction from the document data acquired by the document data acquiring part; a format creating part for deriving the respective features of the character strings extracted by the character string extracting part, and for creating a format containing the derived features in the form of data; a display part on which the character strings extracted by the character string extracting part are displayed in a list form, and on which the format created by the format creating part is displayed; and a format correcting part for correcting the format. The character string extracting part extracts character strings again to conform to the format corrected by the format correcting part.

Second, the present invention is directed to a document processing method. According to an aspect of the document processing method, the method comprises the steps of: (a) acquiring document data; (b) extracting character strings satisfying a predetermined condition for character string extraction from the acquired document data; (c) deriving the respective features of the extracted character strings, and creating a format containing the derived features in the form of data; (d) displaying the extracted character strings in a list form, and displaying the format; (e) correcting the format; and (f) when the format is corrected, extracting character strings again to conform to the corrected format.

Third, the present invention is directed to a computer-readable recording medium on which a program is recorded. According to an aspect of the computer-readable recording medium, the program recorded on the recording medium causes a computer to operate as a system comprising: a document data acquiring part for acquiring document data; a character string extracting part for extracting character strings satisfying a predetermined condition for character string extraction from the document data acquired by the document data acquiring part; a format creating part for deriving the respective features of the character strings extracted by the character string extracting part, and for creating a format containing the derived features in the form of data; a display part on which the character strings extracted by the character string extracting part are displayed in a list form, and on which the format created by the format creating part is displayed; and a format correcting part for correcting the format. The program also causes the character string extracting part to extract character strings again to conform to the format corrected by the format correcting part.

DESCRIPTION OF THE PREFERRED EMBODIMENTS

Figure 1:
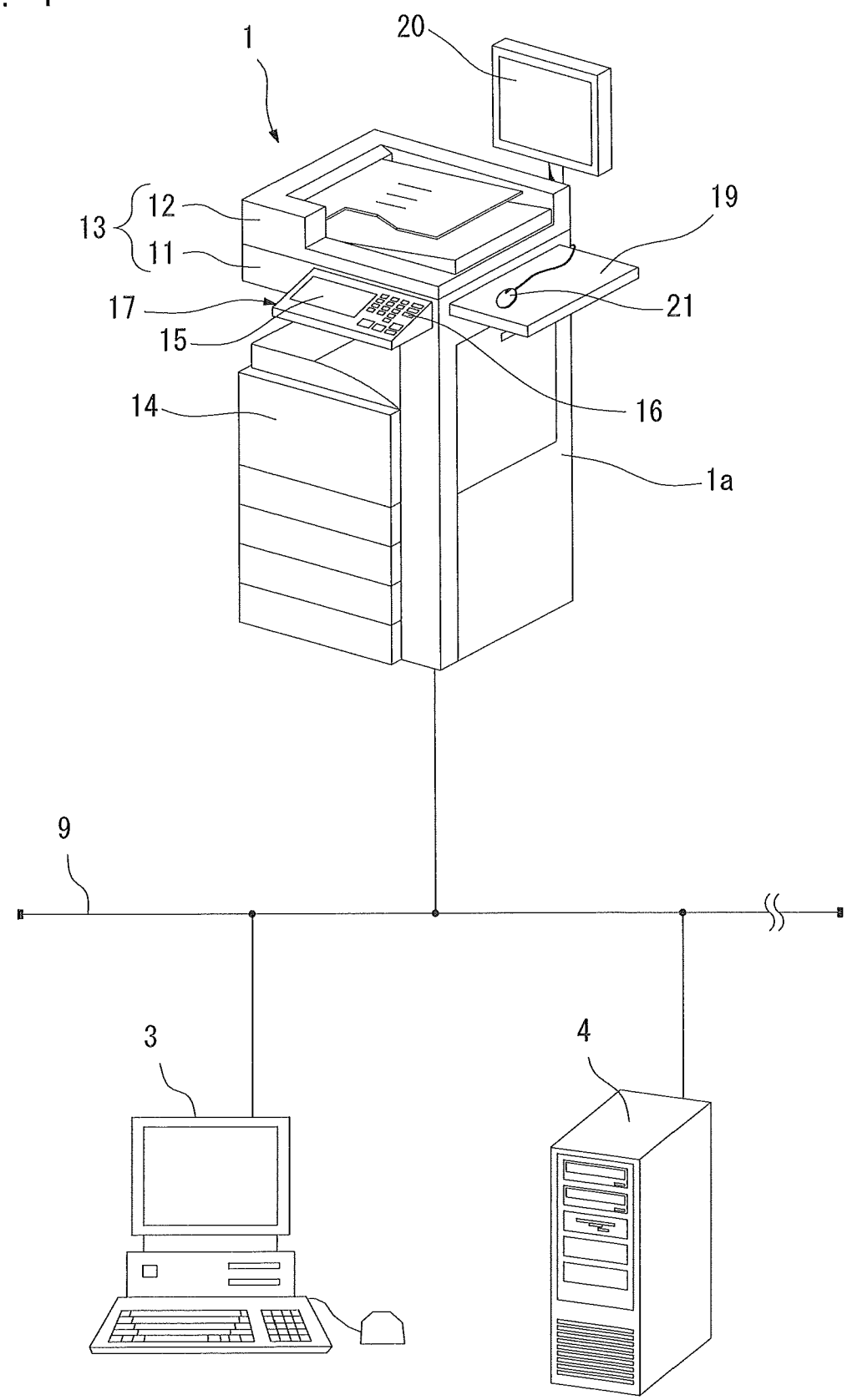
FIG. 1 shows an exemplary configuration of a document processing system according to a preferred embodiment of the present invention.

A preferred embodiment of the present invention is described in detail below with reference to figures. In the description given below, those elements which are shared in common in the preferred embodiment are represented by the same reference numerals, and these elements are not discussed repeatedly for the same description.

FIG. 1 shows an exemplary configuration of a document processing system according to a preferred embodiment of the present invention. The document processing system includes: an image processing device 1 such as a MFP; a computer 3 formed from a generally-used personal computer or the like; and a server 4 having server functions such as a mail server or a data server. These components are connected to each other through a network 9 such as a LAN in a manner that allows data communication therebetween. An external network such as the Internet may be connected to the network 9.

In the preferred embodiment, the image processing device 1 has a function of a document processing device. The document processing device of the present invention may be applied not only to the image processing device 1, but also to the computer 3, the server 4, or other devices.

The image processing device 1 shown in FIG. 1 has several functions including a scan function, a BOX function, a print function, and a copy function. The scan function is intended to read originals to generate image data, and save the generated image data to a storage device 36 (see FIG. 2) in the image processing device 1, or transmit the generated image data through the network 9 to a destination such as the computer 3 or the server 4. The BOX function is intended to perform processing on document data stored in a BOX of the image processing device 1. As an example, with the BOX function, document data stored in the BOX is read, and the read document data is transmitted to a destination such as the computer 3 or the server 4. In the preferred embodiment, the BOX corresponds to a storage region 38 (see FIG. 2) for document data storage provided in the storage device 36. The print function is intended to read document data received from a source such as the computer 3 through the network 9 or document data stored in the BOX, and produce printed outputs. The copy function is intended to read originals, and produce copy outputs.

As shown in FIG. 1, the image processing device 1 includes a scanner unit 13 for reading originals provided at the upper part of a device body 1a. The scanner unit 13 includes an image reader 11 for reading the image of each page of originals one by one, and an automatic document feeder (ADF) 12 from which one page is fed, or multiple pages of an original are fed one by one to the image reader 11, by which the scanner unit 13 is allowed to realize continuous and automatic reading of the multiple pages of the original, for example. An image forming unit 14 for forming images on output media such as sheets is provided at the central part of the device body 1a to produce printed outputs and copy outputs. The image processing device 1 also includes an operational panel 17 arranged on the front side of the scanner unit 13 and operable by a user. The operational panel 17 includes a display unit 15 on which various types of information are displayed to a user, and operation keys 16 operated by the user. The operation keys 16 include push-button keys arranged around the display unit 15, and touch panel keys arranged on the screen of the display unit 15.

The image processing device 1 also includes a display device 20 supported by an upwardly extending support provided on the back side of the device body 1a, and a mouse 21 arranged on a working table 19 attached to a lateral side of the device body 1a. The display device 20 is a display unit on which images can be displayed in a resolution higher than that of images displayed on the display unit 15 of the operational panel 17. The mouse 21 is used together with the operation keys 16 of the operational panel 17 to make entries to the image processing device 1. In the preferred embodiment, the mouse 21 is used to operate a mouse pointer displayed on the display device 20.

In the image processing device 1 of the above-described structure, document data is acquired by using the scan function or the BOX function. When bookmark extraction is ordered by a user, bookmark data is generated by extracting character strings such as headings based on the acquired document data, and the generated bookmark data is added to the document data. The image processing device 1 is described in more detail below.

Figure 2:
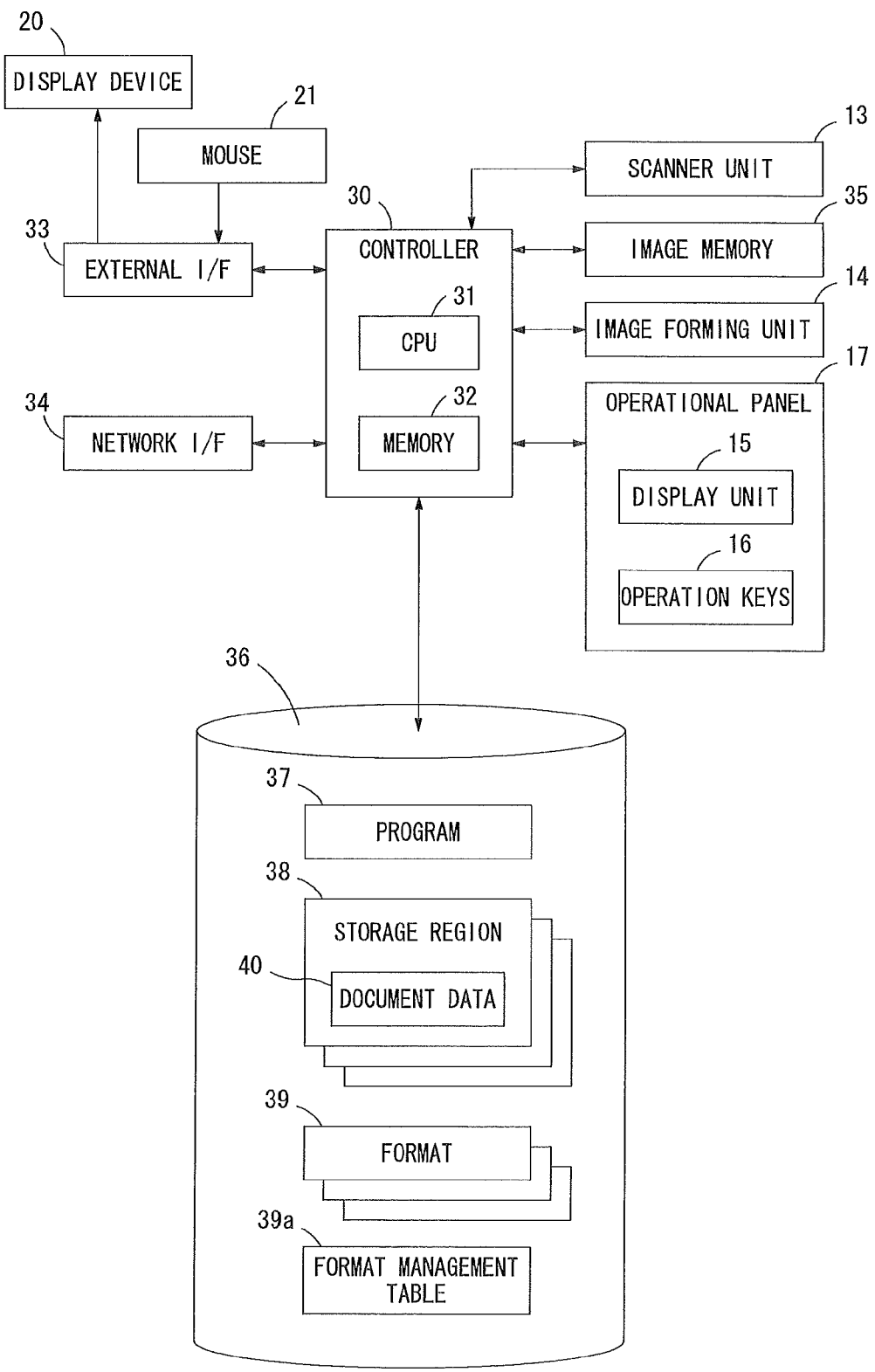
FIG. 2 is a block diagram showing an exemplary hardware configuration of an image processing device functioning as a document processing device.

FIG. 2 is a block diagram showing an exemplary hardware configuration of the image processing device 1. As shown in FIG. 2, the image processing device 1 includes, in addition to the above-described components, a controller 30 for controlling each part, an external interface 33 to which the display device 20 and the mouse 21 are connected, a network interface 34 to which the network 9 is connected, an image memory 35 in which data such as image data read from originals by the scanner unit 13 are temporarily stored, and the storage device 36 formed from a nonvolatile storage element such as a hard disk drive.

The controller 30 includes a CPU 31 and a memory 32. The CPU 31 reads and executes a program 37 stored in the storage device 36, so that the CPU 31 becomes operative to control each part. The memory 32 stores data therein such as temporary data when the CPU 31 executes the program 37. Execution of the program 37 by the CPU 31 causes the controller 30 to perform various processing. Especially in the preferred embodiment, the controller 30 is responsible for principal processing to be performed in a document processing device. More specifically, the controller 30 acquires document data, and extracts character strings as a bookmark that satisfy a predetermined condition (condition for character string extraction) under which character strings are to be extracted from the acquired document data. Then, the controller 30 derives the respective features of the extracted character strings, and creates a format 39 containing the derived features in the form of data. The details of the format 39 are described later. Further, the controller 30 displays the character strings extracted from the document data on the display device 20, by which a user is allowed to see whether or not the character strings extracted as a bookmark achieve a desirable result of extraction. The controller 30 also displays the format 39 containing the respective features of the extracted character strings in the form of data on the display device 20. When determining that the extraction is not made as desired after checking the extracted character strings, the user makes an operation to correct the format 39 displayed on the display device 20 with the mouse 21, the operation keys 16 and others. The controller 30 accepts the operation, and corrects the format 39 accordingly. Then, the controller 30 extracts character strings again from the document data to conform to the corrected format 39.

The storage device 36 contains, in addition to the above-described program 37, a storage region 38 which corresponds to the above-described BOX, and which is set for example for each of a plurality of users. Document data 40 is stored in each of the storage regions 38. The document data 40 stored in the storage regions 38 may be generated by reading of the images of originals by the scanner unit 13, or may be acquired from a source such as the computer 3 through the network 9.

As shown in FIG. 2, the storage device 36 stores a format 39 and a format management table 39a therein. The format 39 contains the respective features of character strings in the form of data extracted from document data as already discussed, and is stored in the storage device 36 when a user orders registration of the format 39 with the image processing device 1, for example. The format 39 is described in more detail later. The storage device 36 can store multiple formats 39 therein. The format management table 39a is table data that manages the formats 39 stored in the storage device 36. The format management table 39a records information indicating correspondence relation for each of the format 39. By way of example, the correspondence relation between the format 39 and information of a user who ordered registration of the format 39, or information of the document data attribute (such as file name) is recorded.

Figure 3:
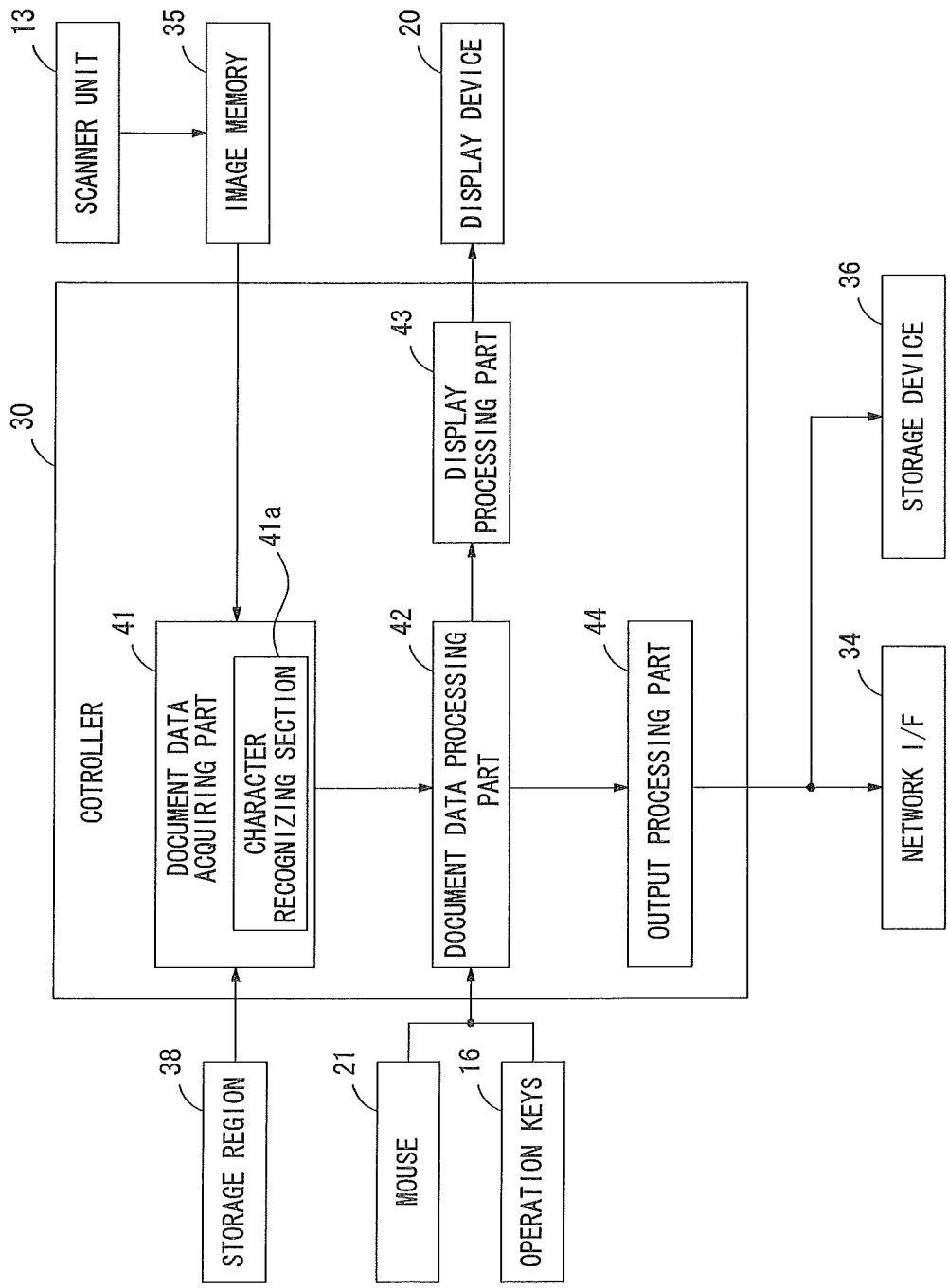
FIG. 3 shows functional blocks in a controller when the image processing device functions as a document processing device.

FIG. 3 shows functional blocks in the controller 30 when the image processing device 1 functions as a document processing device. In this case, the controller 30 functions as a document data acquiring part 41, a document data processing part 42, a display processing part 43, and an output processing part 44, and extracts a bookmark from document data. In the preferred embodiment, a "bookmark" is an aggregate of character strings such as a heading, a title and a subtitle included in a document. When a document consists of a number of parts including a chapter, a section and an article, for example, the respective representative character strings included in the number of parts (such as a chapter title, a section title and an article title) are extracted. The extracted character strings included in the bookmark are ranked in order of appearance in the document.

The document data acquiring part 41 acquires document data as a target of bookmark extraction. As an example, when the scan function of the image processing device 1 is used, the document data acquiring part 41 acquires document data stored in the image memory 35 obtained by reading of the image of an original by the scanner unit 13. When the BOX function of the image processing device 1 is used, the document data acquiring part 41 reads and acquires the document data 40 from a storage region 38 specified by a user. The document data acquiring part 41 has a character recognizing section 41a formed from a device such as an OCR (optical character reader). When document data is image data that is not in text format, for example, the character recognizing section 41a is put into operation to extract all characters contained in the image data.

The document data processing part 42 extracts the bookmark from document data acquired by the document data acquiring part 41. In response to a user's instruction given through the operation keys 16 or the mouse 21, the document data processing part 42 extracts character strings to be the bookmark from the document data. The character string extracting processing may be repeated as many times as needed in response to the user's instruction. Then, in response to the user's instruction, the document data processing part 42 generates bookmark data based on the character strings extracted in the character string extracting processing. The document data processing part 42 thereafter adds the generated bookmark data to the document data, and outputs the document data to the output processing part 44.

The display processing part 43 displays a result of character string extracting processing performed in the document data processing part 42 and the corresponding format 39 on the display device 20. Also, the output processing part 44 outputs the document data to which bookmark data created by the document data processing part 42 is added to the computer 3 through the network interface 34, or saves the document data to the storage region 38 of the storage device 36.

Figure 4:
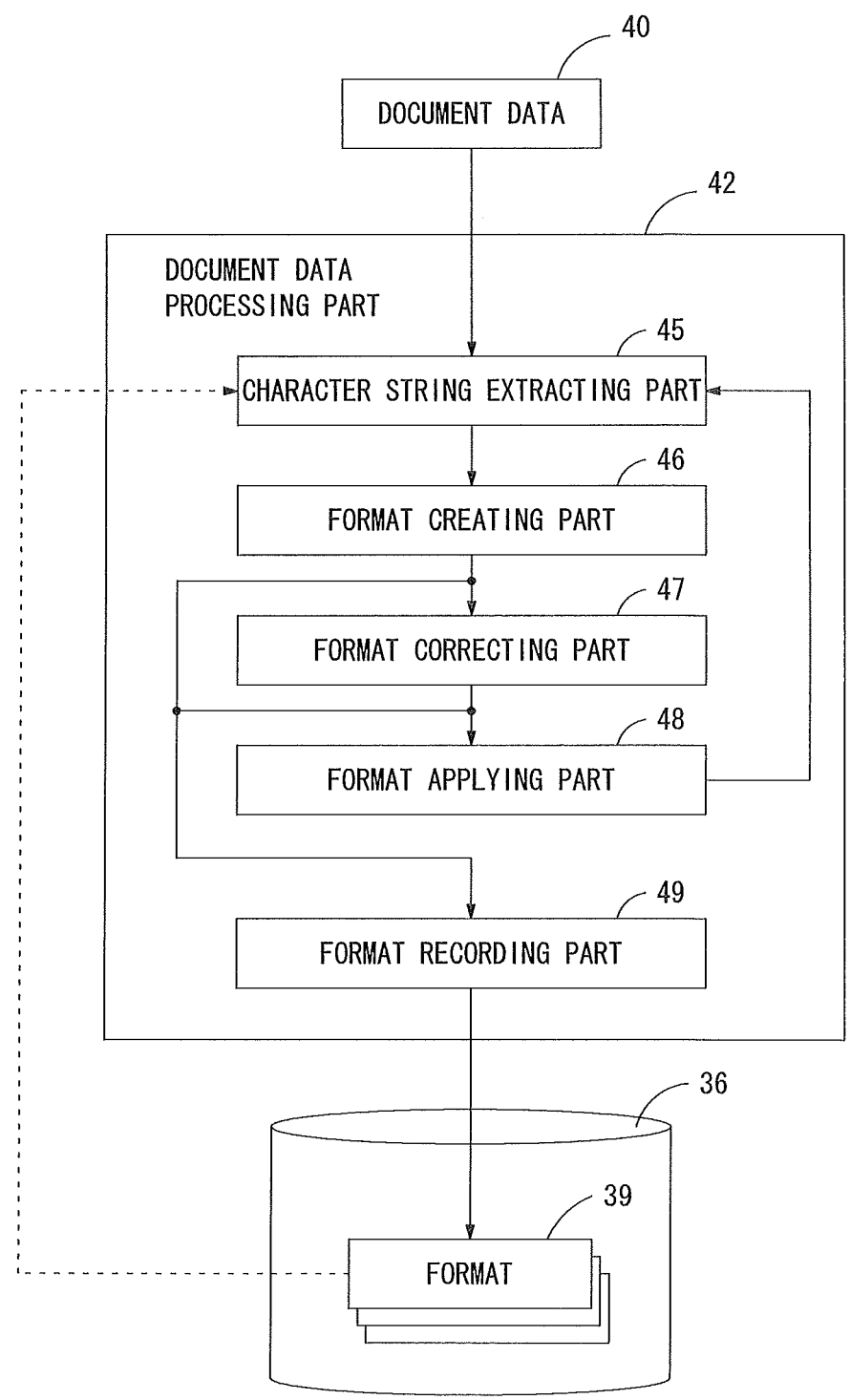
FIG. 4 is a block diagram showing in detail an exemplary structure of a document data processing part.

FIG. 4 is a block diagram showing in detail an exemplary structure of the document data processing part 42. The document data processing part 42 functions as a character string extracting part 45, a format creating part 46, a format correcting part 47, a format applying part 48, and a format recording part 49.

The character string extracting part 45 extracts character strings that are candidates for a bookmark (bookmark candidate character strings) based on the document data 40 received from the document data acquiring part 41. The bookmark candidate character strings correspond to a heading, a title, a subtitle and others extracted from all character strings contained in document data, and which are not yet determined as those being a bookmark as the user intended. The character string extracting part 45 extracts bookmark candidate character strings in two ways as follows.

The first way is based on a predetermined condition for character string extraction defined in advance in the program 37 to extract character strings that satisfy the condition for character string extraction. This way is disclosed, for example, in Japanese Patent Application Laid-Open No. JP 2008-305088 A. In the first way, the bookmark candidate character strings are extracted under the predetermined condition for character string extraction from document data.

The second way is to extract with the format 39 as described above. In the second way, character strings conforming to features defined in the format 39 are extracted as the bookmark candidate character strings from all character strings contained in the document data 40.

The format creating part 46 is put into operation when the character string extracting part 45 extracts character strings in the first way as described above. More specifically, the format creating part 46 derives the respective features of the extracted character strings, and creates the format 39 containing the derived features in the form of data. The creation processing of the format 39 by the format creating part 46 is described in detail later. The format 39 is already present after the character string extracting part 45 extracts character strings in the second way. So, in this case, the format creating part 46 does not create another format 39.

Figure 5:
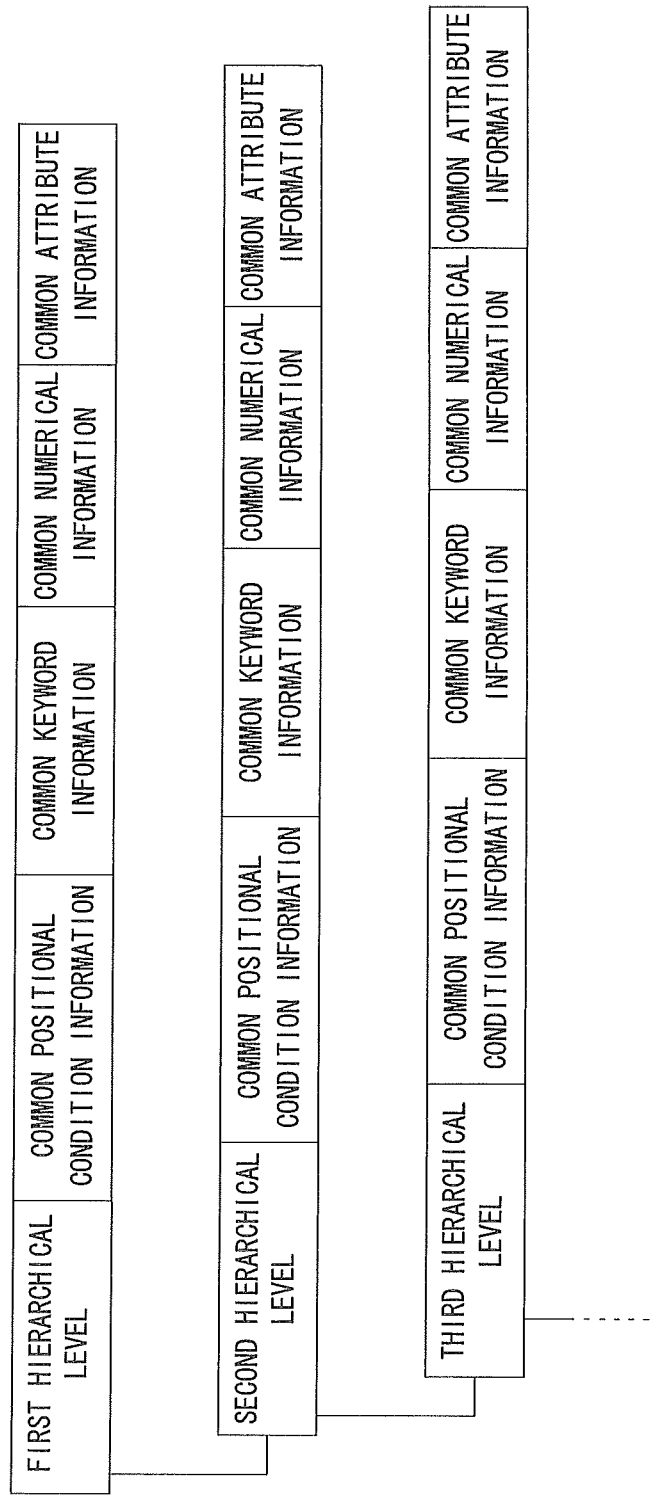
FIG. 5 shows the concept of a format containing the respective features of character strings in the form of data that are extracted as a bookmark.

FIG. 5 shows the concept of the format 39. As shown in FIG. 5, the format 39 is information indicating the respective features of bookmark candidate character strings extracted by the character string extracting part 45. The format 39 contains common positional condition information, common keyword information, common numerical information, and common attribute information concerning four types of features. The format 39 has several hierarchical levels, in each one of which the common positional condition information, common keyword information, common numerical information, and common attribute information are defined. In FIG. 5, the format 39 is shown to have a three-level hierarchical structure including first, second and third hierarchical levels, however, the hierarchy structure of the format 39 is not necessarily limited to the third-level hierarchy structure. This hierarchy structure corresponds to a hierarchical heading structure of bookmark candidate character strings including headings of first-level, second-level and third-level items (hereafter, first-level headings, second-level headings and third-level headings), and headings of items of other levels contained in a document. As an example, the first hierarchical level corresponds to the first-level headings. In the first hierarchical level, information in reference to common features for the first-level headings is contained as the common positional condition information, common keyword information, common numerical information, and common attribute information, respectively. The second hierarchical level corresponds to the second-level headings. In the second hierarchical level, information in reference to common features for the second-level headings is contained as the common positional condition information, common keyword information, common numerical information, and common attribute information, respectively. The third hierarchical level corresponds to the third-level headings. In the third hierarchical level, information in reference to common features for the third-level headings is contained as the common positional condition information, common keyword information, common numerical information, and common attribute information, respectively.

The common positional condition information contains range information concerning bookmark candidate character strings in each hierarchical level. The distance information indicates a range from a reference position in the document (left end of a sheet in the case of a horizontally written document) of the bookmark candidate character strings, thereby specifying an area in the document in which these bookmark candidate character strings are placed. In the case of the first-level headings, for example, information for specifying an area in which the bookmark candidate character strings to be the first-level headings are placed is stored as the common positional condition information of the first hierarchical level. When a different indentation is set for each of the first-level, second-level and third-level items, for example, their respective indentations are incorporated into the common positional condition information.

The common keyword information indicates a character or a character string shared in common among bookmark candidate character strings in each hierarchical level. When the first-level headings contain character strings such as "Chapter 1" and "Chapter 2," for example, "chapter" is the common keyword information of the first hierarchical level.

The common numerical information indicates the location of a number contained in bookmark candidate character strings in each hierarchical level, and which is shared in common among these bookmark candidate character strings. It is assumed, for example, that the first-level headings are "Chapter 1 . . . (name of main theme) . . . ," "Chapter 2 (name of main theme) . . . ," and others. In this case, the initial portion of each character string contains a numerical value indicating the number of a corresponding chapter. So, in the common numerical information of the first hierarchical level, it is defined that the initial portion of each character string includes numerical information for stating a corresponding first-level item. It is also assumed that the second-level headings are "1.1 . . . . (name of subordinate theme) . . . ," "1.2 . . . . (name of subordinate theme) . . . ," and others, for example. In this case, the first to third initial letters (including a dot as the second letter) in each character string corresponds to a numerical value stating the number of each second-level item. So, in the common numerical information of the second hierarchical level, it is defined that the first to third initial letters in each character string contains numerical information for stating a corresponding second-level item. These are applied to the common numerical information of the third hierarchical level, and to those of lower levels. The extracted character strings may be applied to a hierarchical structure based on the common numerical information.

The common attribute information defines attribute information shared in common among bookmark candidate character strings in each hierarchical level. By way of example, when a font, a text size, or decoration such as underlying and italicizing is commonly used among the bookmark candidate character strings in each hierarchical level, the common attribute is stored as the common attribute information.

When the character string extracting part 45 extracts character strings in the first way, the format creating part 46 arranges the character strings extracted as bookmark candidates in a hierarchical structure based on their respective features. Then, the format creating part 46 generates the common positional condition information, common keyword information, common numerical information, and common attribute information as information for indicating the features shared in common in each hierarchical level, thereby creating the format 39.

It is assumed, for example, that the indentation differs among first-level, second-level and third-level items as described above. In this case, areas in which each character string extracted as bookmark candidate is placed differ according to the respective indentations. So, the format creating part 46 derives positional information, indicating where each bookmark candidate character string is placed, as a feature relating to the position of the bookmark candidate character string. When the same positional information is derived from several bookmark candidate character strings, these character strings are categorized into one group. So, several bookmark candidate character strings having a common feature relating to a position are categorized into the same group. A bookmark candidate character string that cannot be categorized into any group is eliminated from consideration as a bookmark, unless it has another feature that is shared in common between a different bookmark candidate character string.

The format creating part 46 also derives keyword information from each bookmark candidate character string as a feature relating to a keyword contained in each bookmark candidate character string. When the bookmark candidate character strings contain keywords such as "chapter," "section" and "article," for example, these keywords are derived as keyword information. When the same keyword information is derived from several bookmark candidate character strings, these character strings are categorized into one group. So, several bookmark candidate character strings having a common feature relating to a keyword are categorized into the same group. A bookmark candidate character string that cannot be categorized into any group is eliminated from consideration as a bookmark, unless it has another feature that is shared in common between a different bookmark candidate character string.

The format creating part 46 also derives numerical information from each bookmark candidate character string as a feature relating to a numerical value contained in each bookmark candidate character string. As an example, when the initial portion of each bookmark candidate character string includes a numerical value, the numerical value in the initial portion is derived as numerical information. When the same numerical information is derived from several bookmark candidate character strings, these character strings are categorized into one group. So, several bookmark candidate character strings having a common feature relating to a numerical value are categorized into the same group. A bookmark candidate character string that cannot be categorized into any group is eliminated from consideration as a bookmark, unless it has another feature that is shared in common between a different bookmark candidate character string.

The format creating part 46 further derives attribute information from each bookmark candidate character string as a feature relating to the attribute of each bookmark candidate character string. As an example, a setting made for each bookmark candidate character string such as a font, a text size, or decoration such as underlying and italicizing is derived as attribute information. When the same attribute information is derived from several bookmark candidate character strings, these character strings are categorized into one group. So, several bookmark candidate character strings having a common feature relating to an attribute are categorized into the same group. A bookmark candidate character string that cannot be categorized into any group is eliminated from consideration as a bookmark, unless it has another feature that is shared in common between a different bookmark candidate character string.

As described, the format creating part 46 derives four types of features from each bookmark candidate character string, and categorizes the bookmark candidate character strings into groups with respect to each of the four types of features. So, four sets of groups are obtained from the four types of features.

The format creating part 46 selects at least one set from the four sets of groups, and arranges one or more groups contained in the selected set in a hierarchical structure. As an example, one or more groups obtained by categorizing bookmark candidate character strings having a common feature relating to a position are arranged in a hierarchical structure corresponding, for example, to the respective indentations of the bookmark candidate character strings. Then, the format creating part 46 associates the bookmark candidate character strings with the hierarchical structure. As a result, the bookmark candidate character strings extracted from the document data 40 are arranged in a hierarchical structure. The format creating part 46 also associates one or more groups included in the other set of groups with the hierarchical structure.

Then, based on the information of each group associated with the hierarchical structure, the format creating part 46 generates information indicating that bookmark candidate character strings in each hierarchical level have a common feature. More specifically, the format creating part 46 generates the above-described common positional condition information, common keyword information, common numerical information, and common attribute information for each hierarchical level, thereby creating the format 39.

By the processing described above, each of the common positional condition information, common keyword information, common numerical information, and common attribute information has a structure corresponding to the hierarchical structure of bookmark candidate character strings. As a result, the format 39 such as the one shown in FIG. 5 is created.

So, when the character string extracting part 45 is put into operation to extract bookmark candidate character strings from the document data 40, for example, in the first way, and the format creating part 46 creates the format 39 based on the extracted bookmark candidate character strings, the document data processing part 42 outputs the bookmark candidate character strings together with the created format 39 to the display processing part 43. This causes the bookmark candidate character strings and the corresponding format 39 to be displayed on the display device 20, by which a user is allowed to see whether or not a desirable result of bookmark extraction is achieved.

Returning to FIG. 4, the format correcting part 47 corrects the format 39 based on user's instructions. The format correcting part 47 corrects the common positional condition information, common keyword information, common numerical information, and common attribute information in each hierarchical level shown in FIG. 5 in response to an operation for correction made by the user.

The format applying part 48 applies the format 39 corrected by the format correction part 47 to the character string extracting part 45, thereby causing the character string extracting part 45 to extract character strings again. For the second extraction, the character string extracting part 45 uses the second way to extract character strings. More specifically, the character string extracting part 45 extracts character strings conforming to features defined in the format 39 corrected by the format correcting part 47, so that bookmark candidate character strings are extracted again from the document data 40. Then, based on a result of the second extraction, a display screen on the display device 20 is updated. As already described, the format creating part 46 does not create another format 39 after character strings are extracted in the second way.

The format recording part 49 stores the format 39 created by the format creating part 46, or the format 39 corrected by the format correcting part 47 into the storage device 36. It is assumed, for example, that the user sees a display screen on the display device 20 to determine that a desirable result of bookmark extraction is achieved, and then gives instructions to output the document with the addition of the extracted bookmark. In this case, the format recording part 49 stores the format 39 at the time of receiving instructions into the storage device 36.

At the same time, the format recording part 49 enters information into the format management table 39a. This information associates the format 39 to be stored in the storage device 36 with the logged-in user who has made the operation, or with the attribute of the document data 40. So, when the same user as the logged-in user logs into the image processing device 1 at a later time, the format 39 used in the past by this user can be read automatically, for example. When a bookmark is to be extracted from document data that has the same attribute as that of the document data from which a bookmark was extracted in the past, the format 39 used in the past can be read automatically. This enhances the convenience of the image processing device 1. Examples of the attribute of the document data 40 include a character string contained in the file name of the document data 40.

Examples of screens displayed on the display device 20 in the processing of bookmark extraction are described next. FIGS. 6 to 10 each shows an example of a screen relating to bookmark extraction displayed on the display device 20. As shown in each of FIGS. 6 to 10, the screen relating to bookmark extraction includes a bookmark format display field 51 in which the above-described detail of the format 39 is displayed, a bookmark preview field 52 in which character strings extracted as bookmark candidates are displayed in a hierarchical structure, and a document preview field 53 in which the content of the document data 40 as a target of bookmark extraction is previewed.

Figure 6:
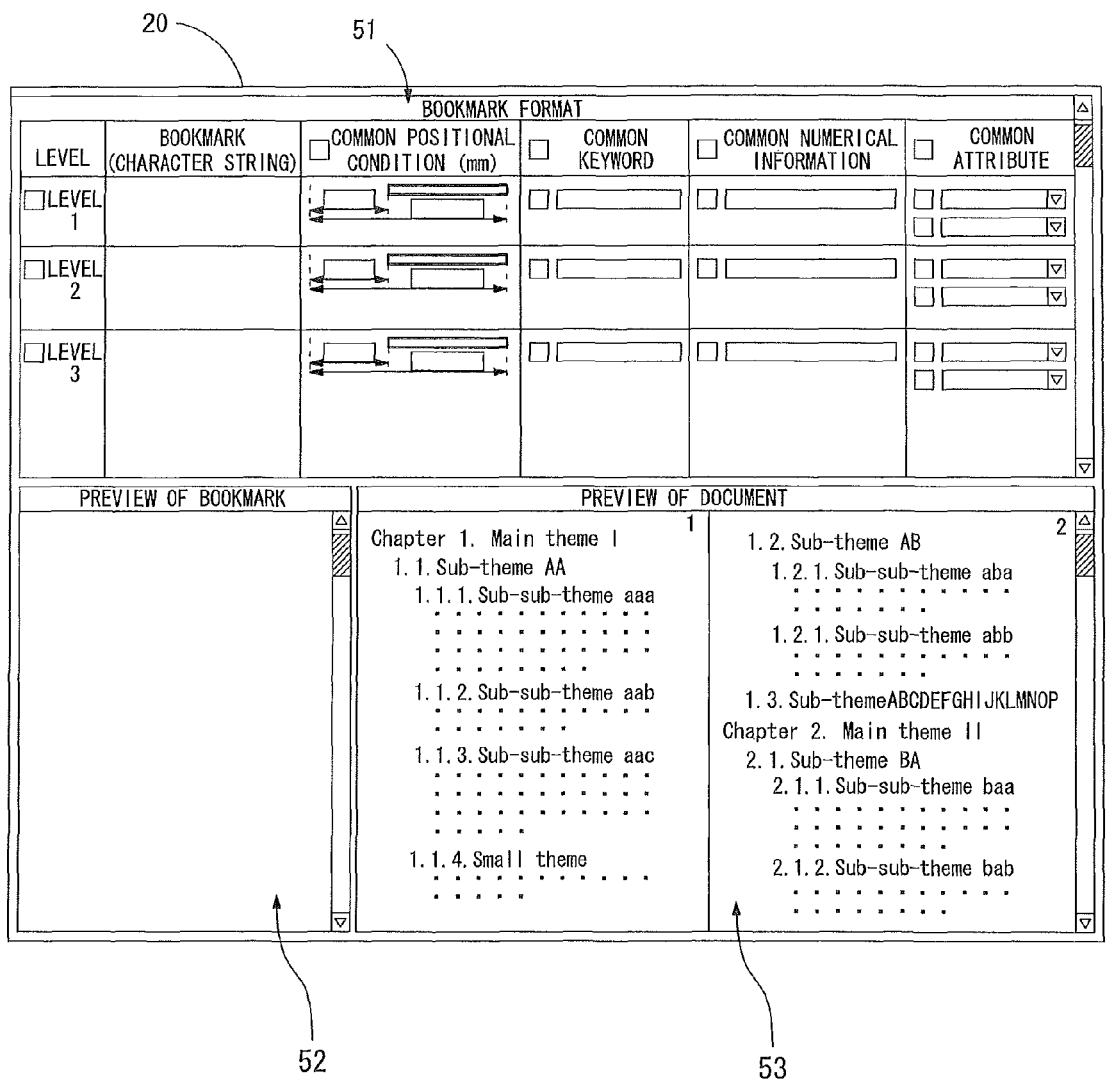
FIG. 6 shows an example of a screen relating to bookmark extraction displayed on a display device.

FIG. 6 shows a screen in a state where the document data 40 as a target of bookmark extraction is entered into the document data processing part 42. In this state, character strings to become bookmark candidates are not extracted. So, on the screen shown in FIG. 6, the content of the document data 40 is previewed in the document preview field 53. The document preview field 53 in FIG. 6 shows the preview of a document including first-level, second-level and third-level items. After character strings to become bookmark candidates are extracted in the first way, and a corresponding format 39 is created, the screen on the display device 20 is changed to the one shown in FIG. 7.

Figure 7:
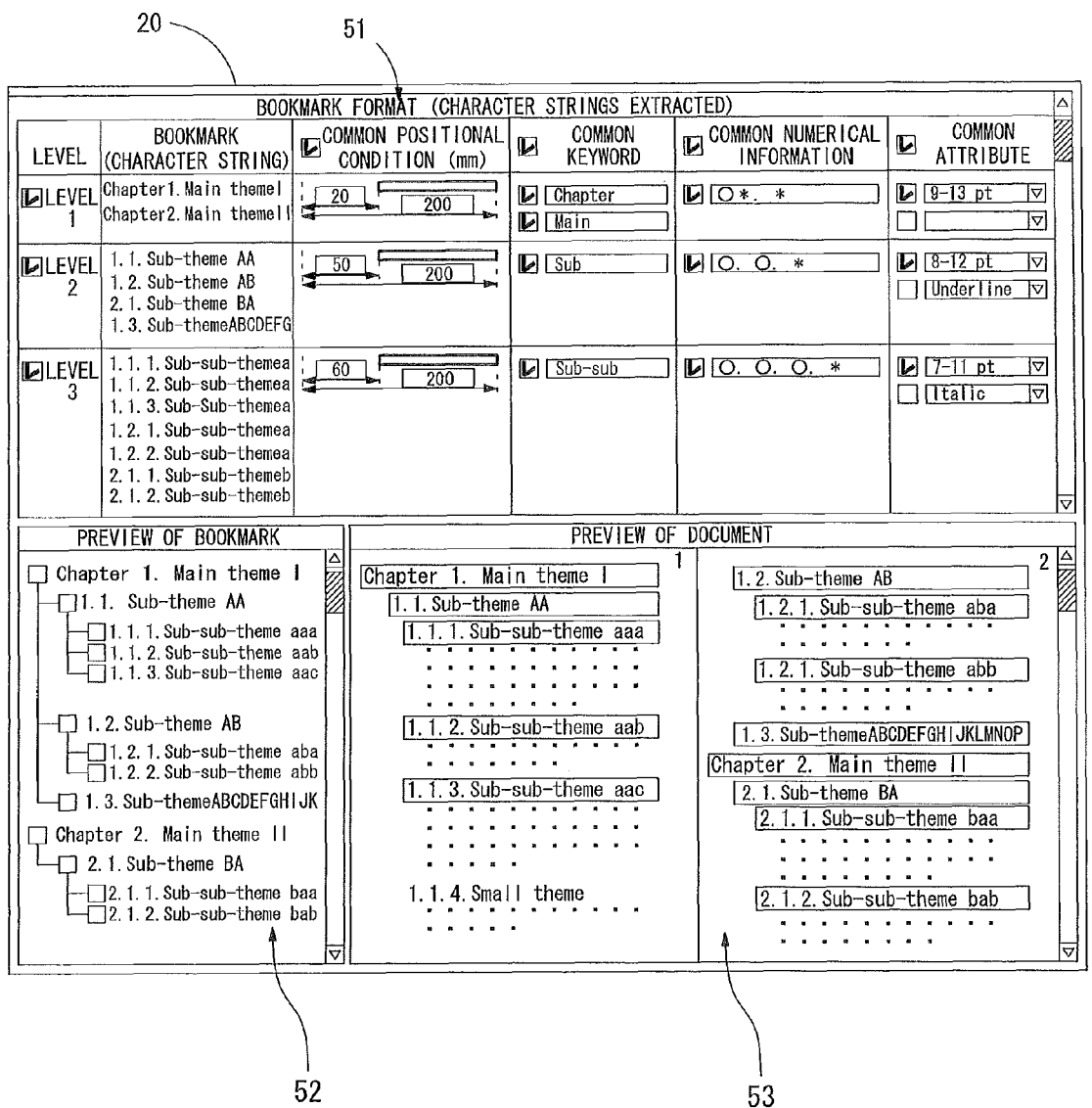
FIGS. 7 to 10 each shows another example of a screen relating to bookmark extraction displayed on the display device.

After the bookmark extraction, the detail of the format 39 corresponding to the character strings extracted as bookmark candidates is displayed in the bookmark format display field 51 as shown in FIG. 7. In FIG. 7, character strings corresponding to items of three hierarchical levels including the first-level, second-level and third-level items are displayed in "BOOKMARK (CHARACTER STRING)" columns. On the right side of the "BOOKMARK (CHARACTER STRING)" columns, common positional conditions, common keywords, common numerical information, and common attribute information, each shared as common features among character strings in each hierarchical level, are associated with the hierarchical structure and displayed. Further, the character strings extracted as bookmark candidates are displayed in the hierarchical structure in the bookmark preview field 52. The character strings extracted as bookmark candidates are displayed with decoration, for example, with rectangular boxes in the document preview field 53, so that the parts extracted as bookmark candidates can easily be found.

Character strings extracted as bookmark candidates displayed in the bookmark format display field 51 and the bookmark preview field 52 are linked to the document data 40. So, a character string displayed in each of the bookmark format display field 51 and the bookmark preview field 52, and a character string contained in a preview image displayed in the document preview field 53 are shown as being linked to each other. As an example, when a user selects one from multiple extracted character strings, an image region corresponding to the selected character string appears in a predetermined display position (such as left upper end) in the document preview field 53.

Correction of the format 39 is described next. It is assumed, for example, that the user checks character strings extracted as candidates for a bookmark displayed on the screen shown in FIG. 7, and determines that a desirable result of bookmark extraction is not achieved. In this case, the user corrects each piece of information displayed in the bookmark format display field 51 with the mouse 21 and the like, so that the user can correct the character strings as the bookmark.

Figure 8:
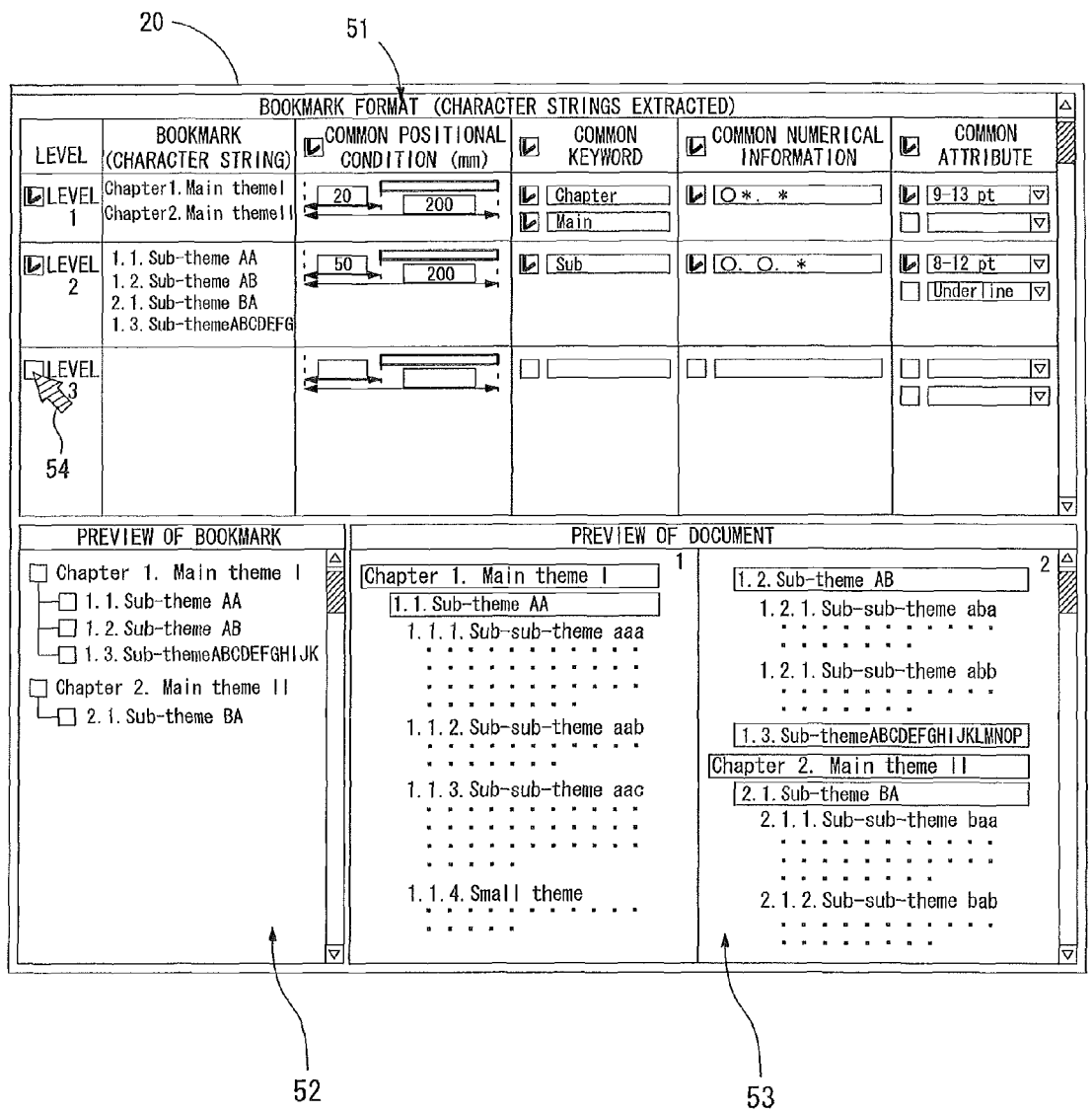

FIG. 8 shows a screen in which character strings in the third hierarchical level are eliminated from the candidates for the bookmark after the user's operation for correction is made to the display screen shown in FIG. 7. As an example, the user operates the mouse 21 to move a mouse pointer 54 to a check box of the third hierarchical level displayed in the left end of the bookmark format display field 51 as shown in FIG. 8. Then, the user clicks the check box of the third hierarchical level to eliminate all the extracted character strings in the third hierarchical level from the candidates for the bookmark, so that the screen is changed from the one of FIG. 7 to the one of FIG. 8. That is, this operation deletes all the information in the third hierarchical level contained in the format 39, so that the format 39 is corrected to be formed from first and second hierarchical levels. Then, character strings are extracted again as candidates for the bookmark based on the corrected format 39. The screen of FIG. 8 shows a result of the second extraction.

As shown in FIG. 8, the character strings extracted again as candidates for the bookmark are shown in a hierarchical structure in the bookmark preview field 52. More specifically, in FIG. 8, the character strings associated with the third hierarchical level are deleted. The character strings extracted as candidates for the bookmark are displayed with decoration with rectangular boxes in the document preview field 53. Compared to the character strings seen in FIG. 7, those in FIG. 8 corresponding to the third-level items (in the third hierarchical level) are no longer decorated with rectangular boxes.

Figure 9:
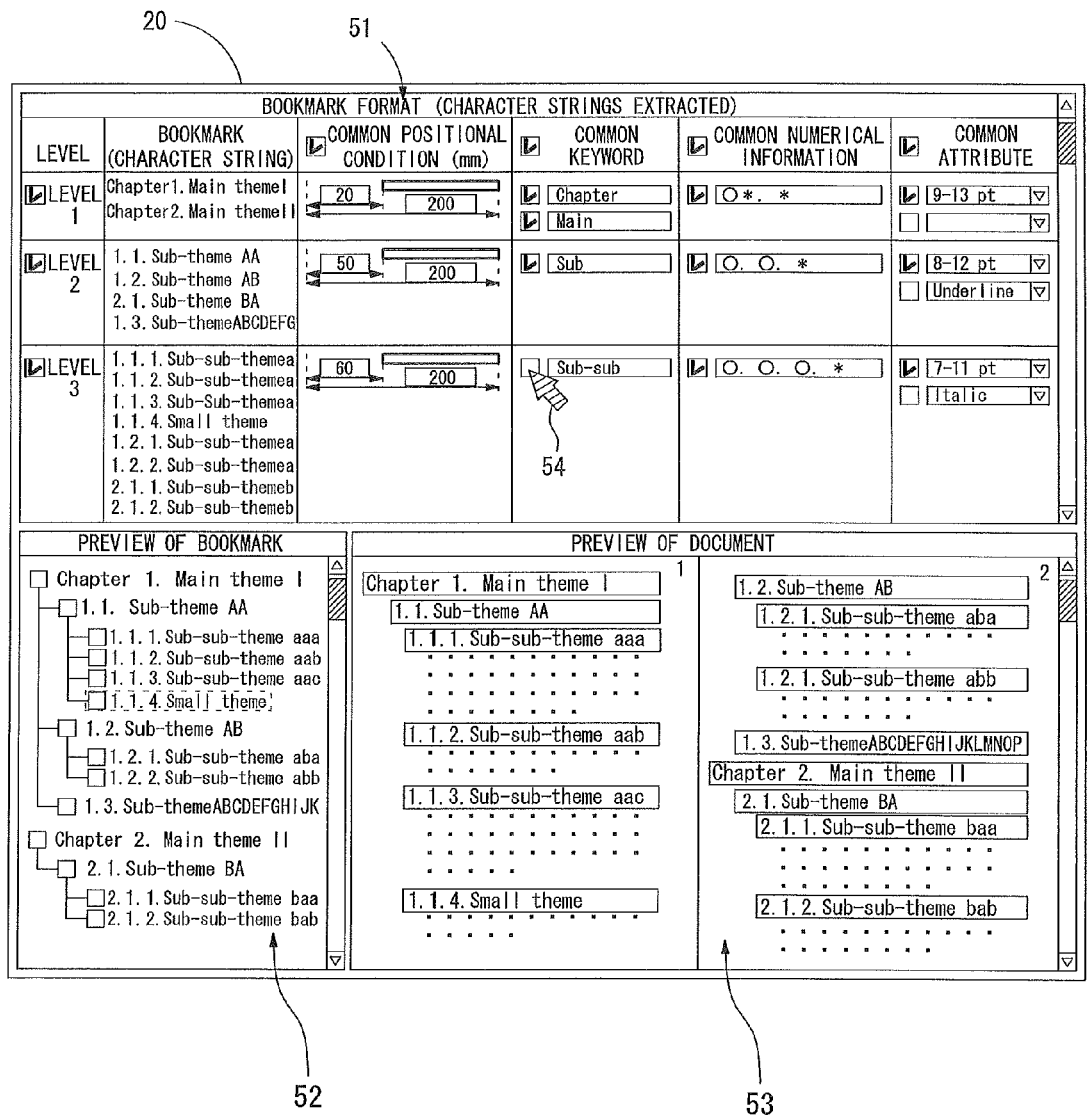

FIG. 9 shows a screen in which the common keyword of the third hierarchical level is eliminated from the features shared in common in the third hierarchical level after the user's operation for correction made to the display screen shown in FIG. 7. As an example, the user operates the mouse 21 to move the mouse pointer 54 to a check box corresponding to a common keyword of the third hierarchical level as shown in FIG. 9. Then, the user clicks the check box to eliminate the common keyword of the third hierarchical level from the features shared in common in the third hierarchical level, so that the screen is changed from the one of FIG. 7 to the one of FIG. 9. In FIG. 7, a word "Sub-sub" is a feature shared in common in the third hierarchical level as the common keyword of the third hierarchical level. The setting of the common keyword of the third hierarchical level is canceled as a result of the above-described operation. More specifically, according to this operation, the common keyword of the third hierarchical level is deleted from the format 39, and the format 39 is corrected. Then, character strings are extracted again as candidates for a bookmark based on the corrected format 39. The screen of FIG. 9 shows a result of the second extraction.

As shown in FIG. 9, another third-level item "1.1.4. Small theme" that does not include the word "Sub-sub" is newly added as a bookmark candidate to the bookmark preview field 52. Further, the character string of the third-level item added as the candidate for the bookmark is displayed with decoration with a rectangular box in the document preview field 53.

Figure 10:
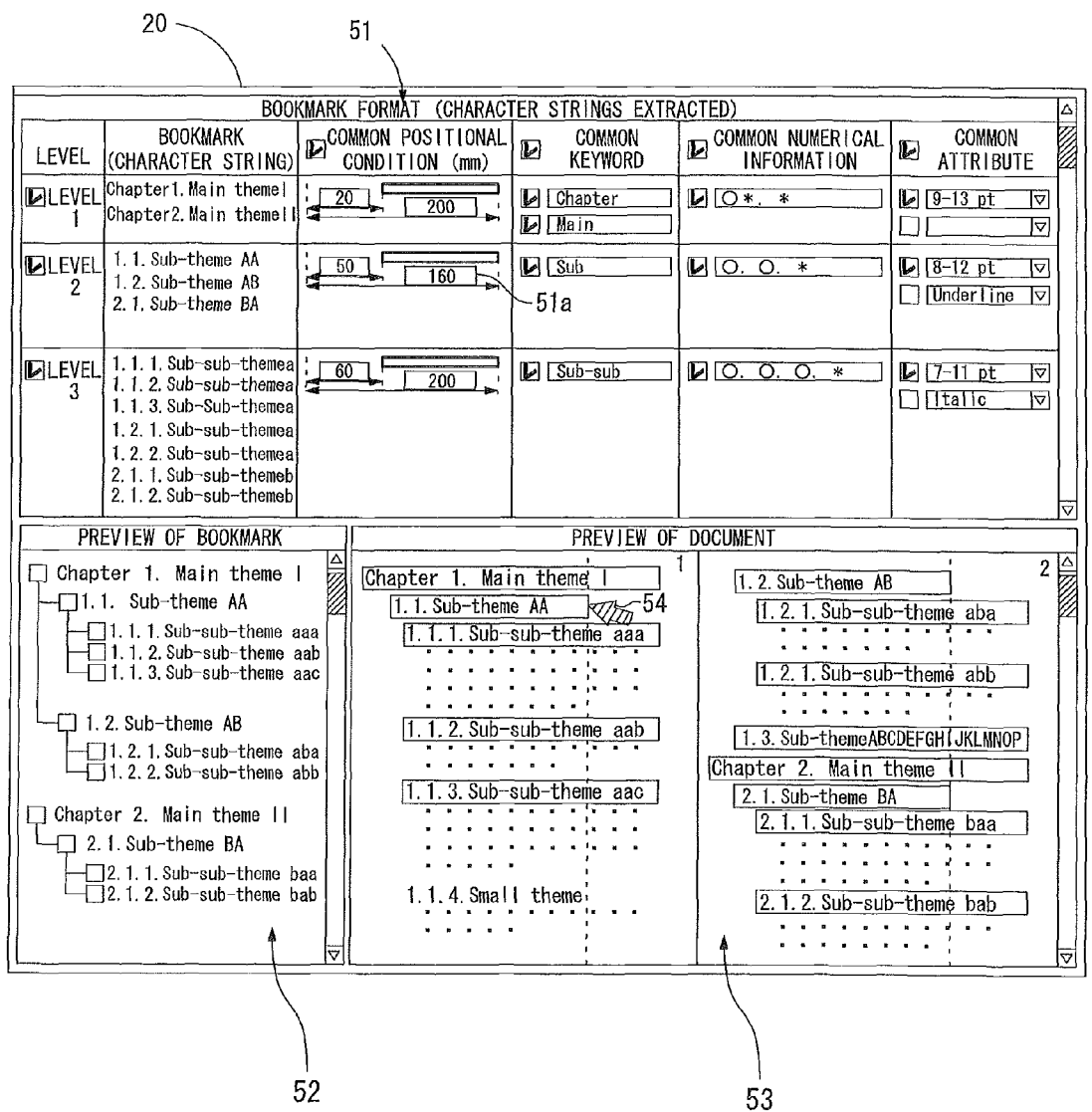

FIG. 10 shows a screen in which a common positional condition of the second hierarchical level is corrected after the user's operation for correction made to the display screen shown in FIG. 7. As an example, the user operates the mouse 21 to move the mouse pointer 54 to a rectangular box corresponding to the second hierarchical level (second-level item) in the document preview field 53 as shown in FIG. 10. Then, the user drags the right edge of the rectangular box to a different position to correct the common positional condition of the second hierarchical layer. This is not the only way of correcting the common positional condition. As an example, a value indicating a range from a reference position (a value of a region display field 51*a*) in a document displayed in the bookmark format display field 51 may be entered through a numeric keypad to correct the common positional condition. For the common positional condition of the second hierarchical level shown in FIG. 10, the positions of the right edges of rectangular boxes corresponding to the second level items are shifted to the left as compared to the corresponding positions shown in FIG. 7. So, the common positional condition is corrected to define smaller areas in which character strings corresponding to the second-level items are arranged. The operation described above corrects the common positional condition of the second hierarchical level in the format 39, thereby correcting the format 39. Then, character strings are extracted again as candidates for the bookmark based on the corrected format 39. The screen of FIG. 10 shows a result of the second extraction.

As shown in FIG. 10, a second-level item "1.3. Sub-theme ABCDEF . . . " that was one of candidates for the bookmark of the second hierarchical level at first is deleted from the bookmark preview field 52. The second-level item "1.3. Sub-theme ABCDEF . . . " is also shown to be eliminated from consideration as the bookmark in the document preview field 53.

As described, in the preferred embodiment, the user makes an operation for correcting the format 39 displayed on the display device 20 when character strings extracted as candidates for the bookmark do not achieve a result of extraction desired by the user. Then, the image processing device 1 extracts character strings again based on the corrected format 39. The user's operation for correction is to correct a feature shared in common among character strings extracted as candidates for the bookmark (such as the common positional condition information, the common keyword information, the common numerical information, or the common attribute information). So, the format 39 is efficiently corrected with a simple operation.

The operation of the image processing device 1 is described next. FIGS. 11 to 14 are flow diagrams each explaining an exemplary operation of the image processing device 1. The controller 30 of the image processing device 1 is mainly responsible for the processes to be performed based on these flow diagrams. FIGS. 15 to 17, 18A and 18B, and 19A and 19B each shows an exemplary display screen displayed on the display unit 15 of the operational panel 17 of the image processing device 1.

Figure 11:
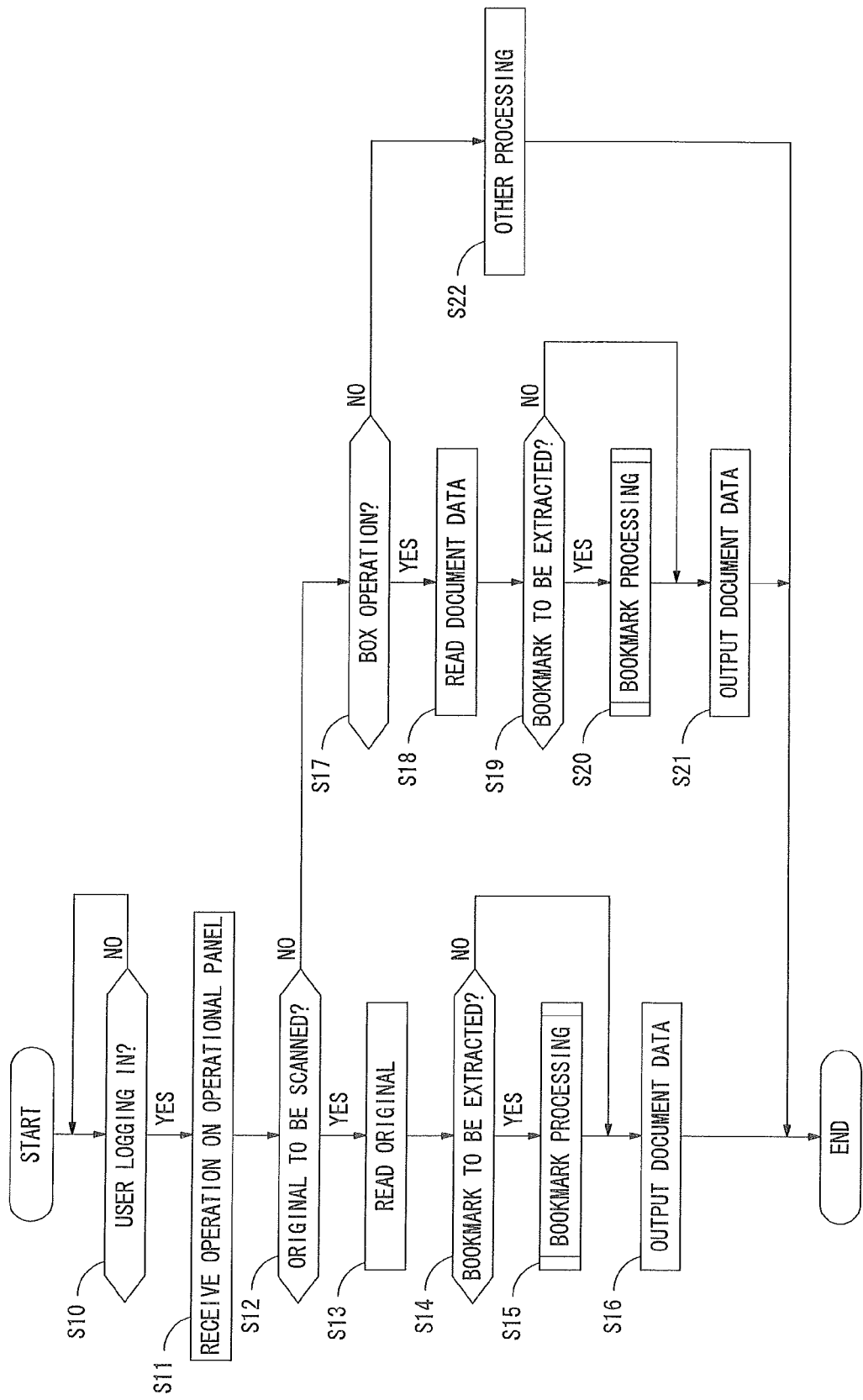
FIG. 11 is a flow diagram explaining an exemplary operation of the image processing device.
Figure 15:
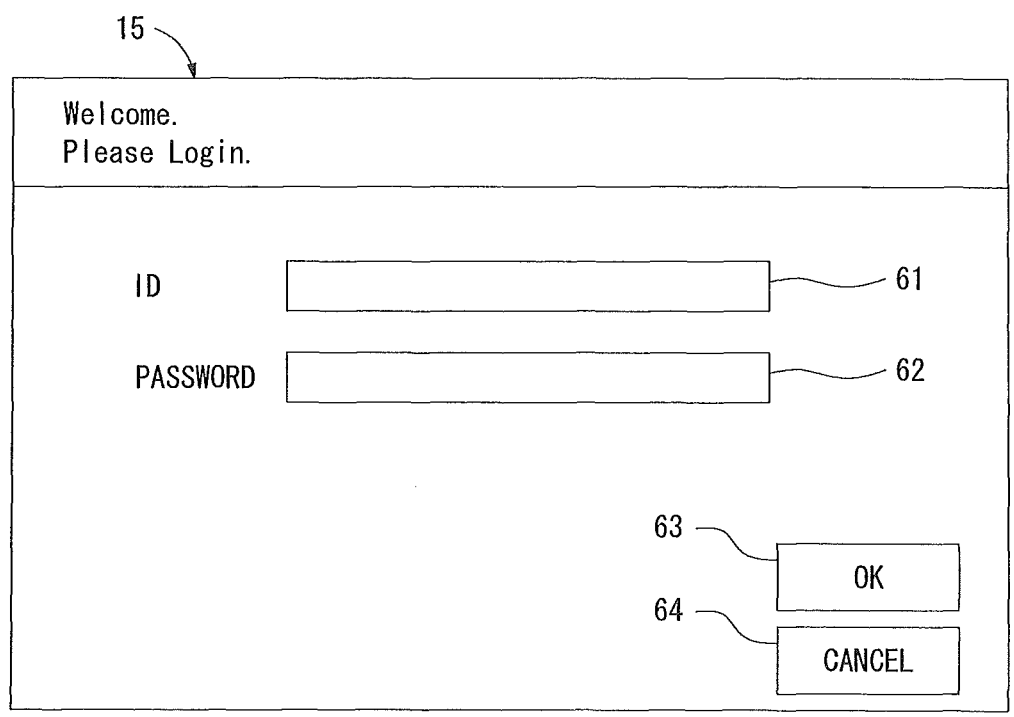
FIG. 15 shows an example of a display screen displayed on a display unit of an operational panel.

As shown in FIG. 11, the image processing device 1 waits for a user to log in its initial state (step S10). FIG. 15 shows a display screen displayed at the waiting state on the display unit 15 of the operational panel 17. As shown in FIG. 15, an ID entry field 61 and a password entry field 62 are displayed on the display unit 15 at the waiting state for log in. A user operates, for example, the operation keys 16 of the operational panel 17 to enter necessary information into these entry fields, and then operates an OK key 63. In response, the image processing device 1 performs user authentication. The image processing device 1 identifies the user when the user is successfully authenticated, by which the image processing device 1 is put into a state in which the user logging into the image processing device 1 (a result of step S10 is YES). A cancel key 64 shown in FIG. 15 is provided to cancel information entered into the ID entry field 61 or the password entry field 62.

After the image processing device 1 is put into the state in which the user is logging into the image processing device 1 (when a result of step S10 is YES), a function that is set in advance for the user is made available for the user. Then, the image processing device 1 receives a user's operation on the operational panel 17 (step S11).

When the user selects the scan function to order scan of an original (when a result of step S12 is YES), the image processing device 1 puts the scanner part 13 into operation to read the original (step S13). The image processing device 1 thereafter determines whether or not the user has ordered bookmark extraction (step S14). When the bookmark extraction is ordered (when a result of step S14 is YES), the image processing device 1 performs a bookmark processing (step S15). In this bookmark processing, bookmark data is added to document data 40. In contrast, the image processing device 1 does not perform the bookmark processing when bookmark extraction is not ordered (when a result of step S14 is NO). The image processing device 1 thereafter outputs the document data 40 read from the original, and completes the procedure (step S16). The details of the bookmark processing are described later.

Figure 16:
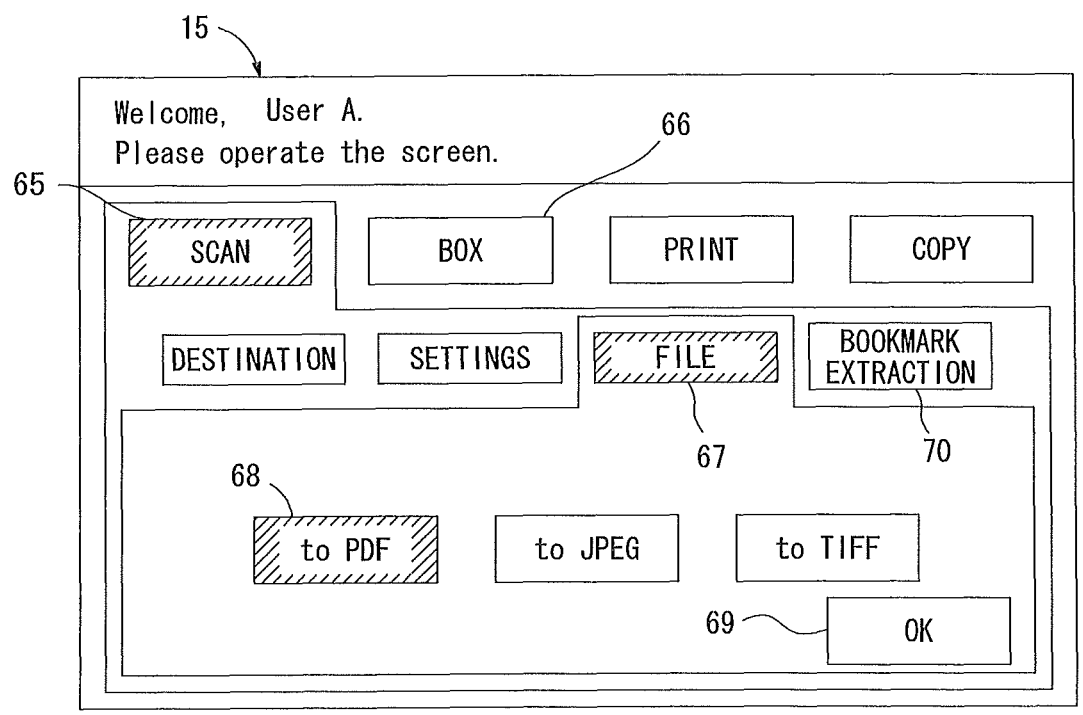
FIGS. 16, 17, 18A and 18B, and 19A and 19B each shows an example of a display screen displayed on the display unit of the operational panel.

FIG. 16 shows an example of a display screen that is displayed when the user selects the scan function. The screen shown in FIG. 16 is displayed, for example, when the user selects a scan key 65 and then a file key 67. This screen allows the user to select a file format of image data acquired from the original from PDF, JPEG and TIFF for output of the image data. In FIG. 16, a PDF key 68 is shown to be selected. Then, the user operates an OK key 69, by which the file format of the image data for output is fixed. In the preferred embodiment, a bookmark extraction key 70 becomes operable, for example, when the user selects the PDF key 68. The user thereafter operates the bookmark extraction key 70, by which the image processing device 1 is instructed to extract a bookmark.

Returning to FIG. 11, when the user selects the BOX function to order a BOX operation after the user logged in (when a result of step S12 is NO and when a result of step S17 is YES), the image processing device 1 reads document data 40 from a BOX (storage region 38) designated by the user (step S18). Then, the image processing device 1 determines whether or not the user has ordered bookmark extraction (step S19). When bookmark extraction has been ordered (when a result of step S19 is YES), the image processing device 1 performs the bookmark processing (step S20). In contrast, the image processing device 1 does not perform bookmark processing when bookmark extraction has not been ordered (when a result of step S19 is NO). The image processing device 1 thereafter outputs the document data 40 read from the BOX (storage region 38), and completes the procedure (step S21). This bookmark processing (step S20) is the same as that performed in step S15, and is described in detail later.

Figure 17:
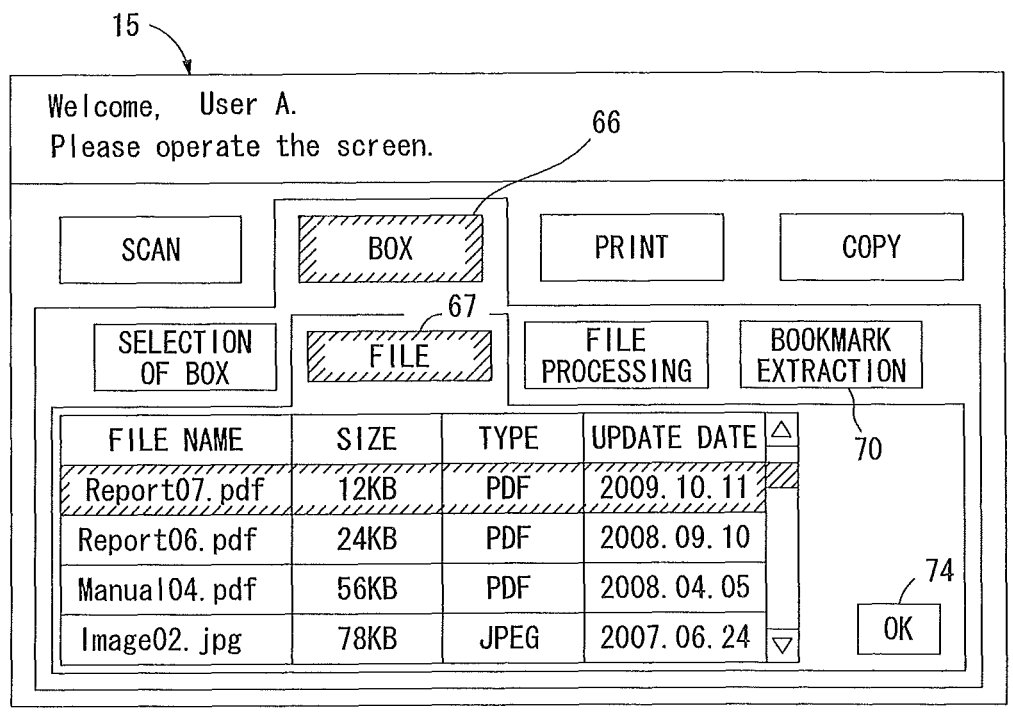

FIG. 17 shows an example of a display screen that is displayed when the user selects the BOX function. The screen shown in FIG. 17 is displayed, for example, when the user selects a BOX key 66 and then the file key 67. This screen includes document data in a list form stored in the BOX designated by the user, and allows the user to select desirable document data 40. In FIG. 17, document data with a file name "Report07.pdf" is shown to be selected. Then, the user operates an OK key 74, by which document data to be read from the BOX is fixed. In the preferred embodiment, the bookmark extraction key 70 becomes operable, for example, when the user selects a PDF file. The user thereafter operates the bookmark extraction key 70, by which the image processing device 1 is instructed to extract a bookmark.

When the user orders a processing other than the above-described processing (when results of steps S12 and S17 are both NO), the image processing device 1 performs the processing as ordered (such as the copy function) (step S22), and then completes the procedure.

Figure 12:
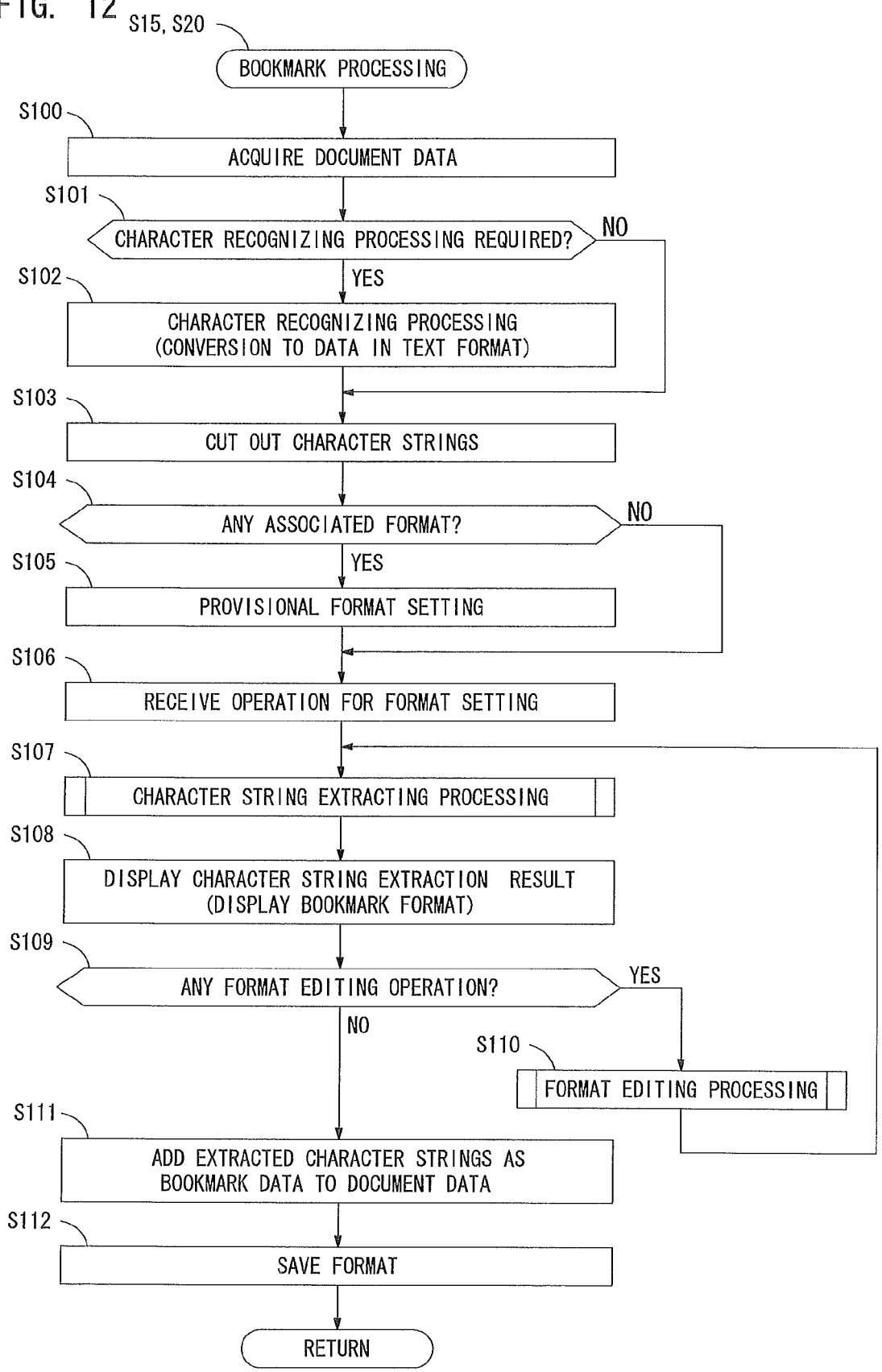
FIG. 12 is a flow diagram explaining in detail an exemplary procedure of a bookmark process.

FIG. 12 is a flow diagram explaining in detail an exemplary procedure of the bookmark processing (steps S15 and S20). After starting the bookmark processing (steps S15 and S20), the image processing device 1 acquires document data as a target of bookmark extraction (step S100). As an example, the image processing device 1 acquires document data 40 from the image memory 35 when a bookmark is to be extracted after scan of an original. As another example, the image processing device 1 acquires document data 40 from a storage region 38 designated by the user when a bookmark is to be extracted with a BOX operation.

Next, the image processing device 1 determines whether or not the acquired document data 40 requires a character recognizing processing (step S101). Here, this determination is made based on whether or not the document data 40 is in text format with characters contained in the document data 40 represented by character codes. The image processing device 1 determines that the character recognizing processing should be performed when the document data 40 is not in text format. When determining that the character recognizing processing should be performed (when a result of step S101 is YES), the image processing device 1 performs the character recognizing processing to represent each of the characters in the document data 40 by a character code, thereby converting the document data 40 to data in text format (step S102). In contrast, the image processing device 1 does not perform the character recognizing processing when determining that the character recognizing processing is not required (when a result of step S101 is NO).

The image processing device 1 thereafter cut all character strings out of a document of the document data 40 based on the document data 40 in text format (step S103). So, all the character strings contained in the document data 40 are extracted. Further, the size, the position and others of each character string in the document are specified.

Next, the image processing device 1 determines based on the format management table 39*a* whether the storage device 36 stores therein a format 39 associated with the logged-in user, or a format 39 associated with the attribute of the document data 40 (step S104). When the format management table 39*a* stores therein the format 39 associated with the logged-in user, or the format 39 associated with the attribute of the document data 40 (when a result of step S104 is YES), the image processing device 1 reads the associated format 39 from the storage device 36, and sets the read format 39 as a format to be applied (step S105). In contrast, the image processing device 1 does not set any format 39 as a format to be applied when the format management table 39*a* does not store an associated format 39 therein. Then, the image processing device 1 displays a setting screen relating to bookmark extraction on the display unit 15 of the operational panel 17 to receive a user's operation for format setting (step S106).

Figure 18A:
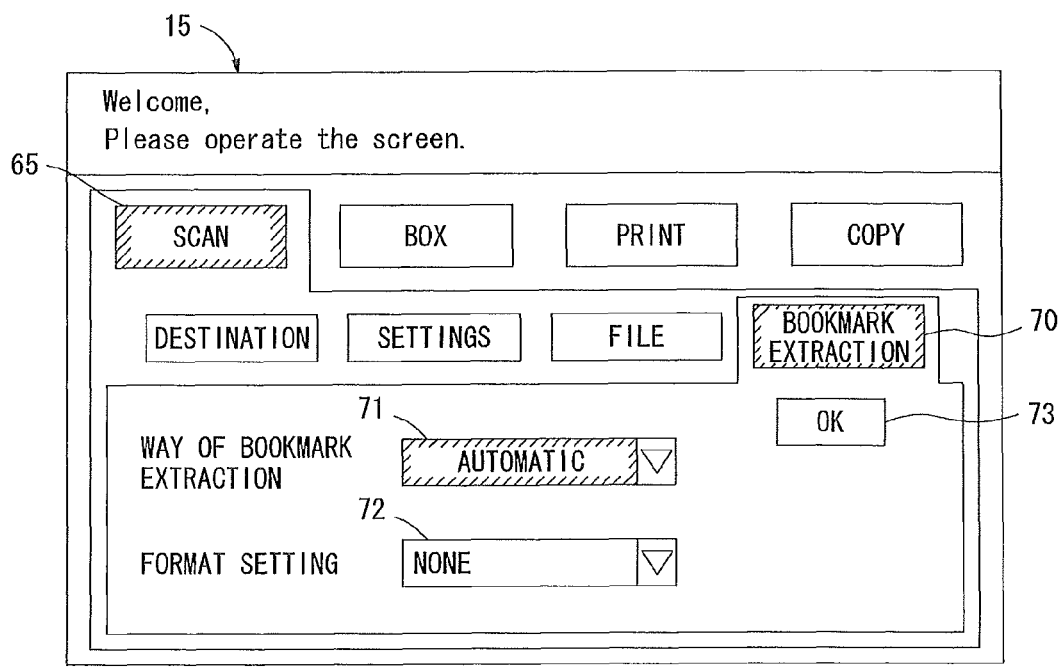
Figure 18B:
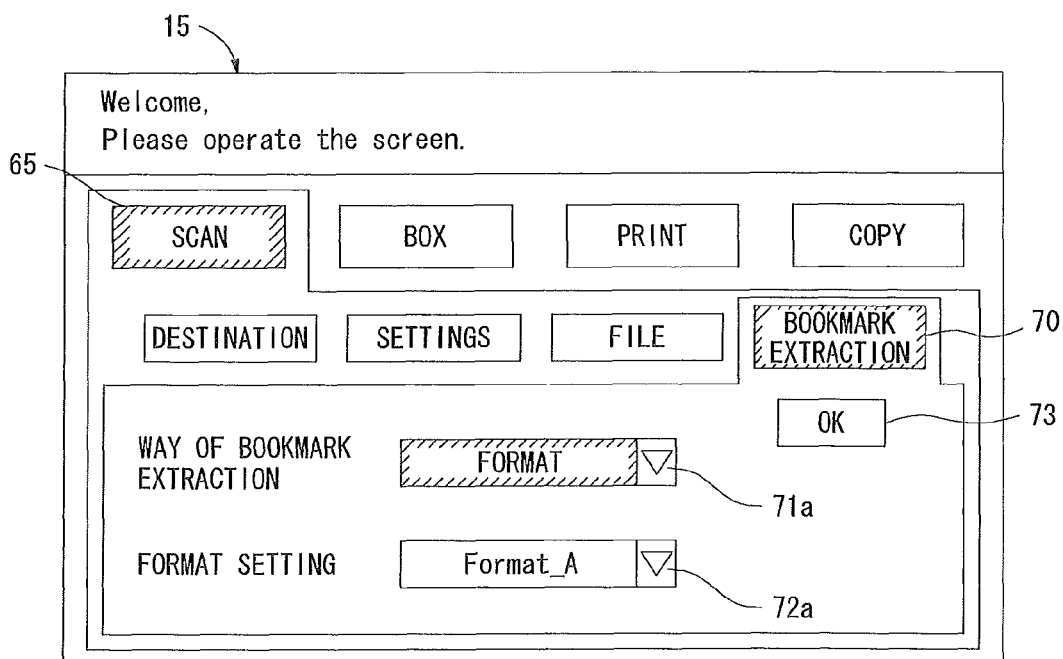

FIGS. 18A and 18B each shows an exemplary setting screen displayed when the user ordered bookmark extraction after selecting the scan function. As shown in FIGS. 18A and 18B, each of these setting screens includes a field 71 for designating a way of bookmark extraction, and a format setting field 72. In the setting screen shown in FIG. 18A, "AUTOMATIC" is selected as a way of bookmark extraction. This "AUTOMATIC" means that character strings are to be extracted as candidates for a bookmark in the above-described first way. When the format 39 associated with the login user "A" is not stored in the storage device 36 of the image processing device 1, for example, "AUTOMATIC" is set as a default, and is displayed on the display unit 15. Then, the user orders extraction of character strings in the first way by operating an OK key 73.

In the setting screen shown in FIG. 18B, bookmark extraction employing the format 39 that corresponds to the above-described second way is selected as a way of bookmark extraction. In the setting screen of FIG. 18B, "Format_A" associated with the user "A" is set as a format to be applied. When "Format_A" associated with the logged-in user "A" is stored as one of multiple formats 39 stored in the storage device 36 of the image processing device 1, for example, the image processing device 1 selects "FORMAT" as a default as a way of bookmark extraction, and further selects "Format_A" as a default as a format to be applied. Then, the user orders extraction of character strings by applying the format 39 corresponding to "Format_A" by operating an OK key 73. When the user wishes to change the format to be applied at character string extraction, the user may click a pull down button 72*a* provided in the right edge of the format setting field 72. Then, all formats 39 stored in the storage device 36 appear in a pulldown list, so the user can select a desirable format 39 therefrom. When the user wishes to change a way of bookmark extraction to "AUTOMATIC," the user may click a pull down button 71*a* provided in the right edge of the field 71 for designating a way of bookmark extraction. Then, "AUTOMATIC" appears as an alternative in a pulldown list, so the user can change the way of bookmark extraction by selecting the alternative.

Figure 19A:
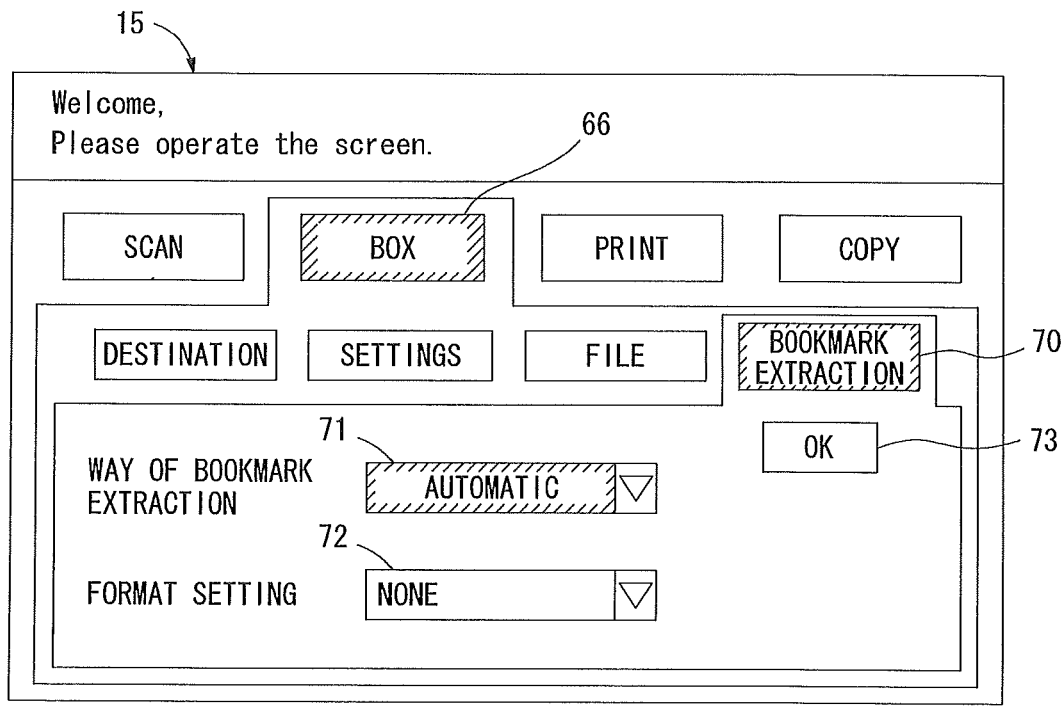
Figure 19B:
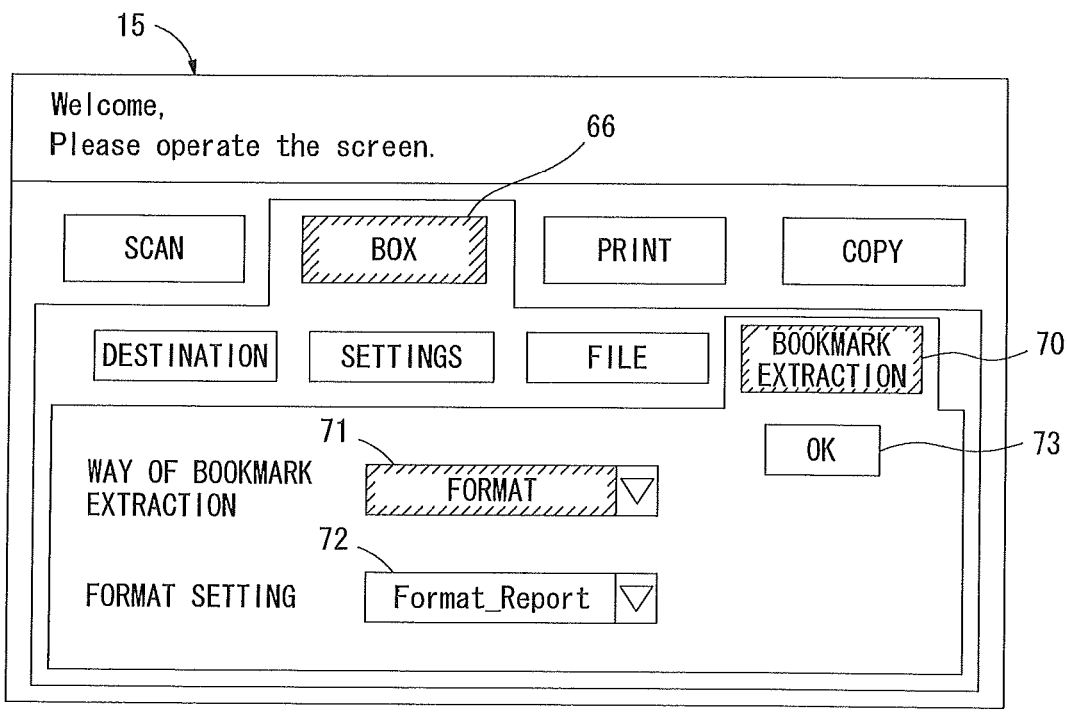

FIGS. 19A and 19B each shows an exemplary setting screen displayed when the user has ordered bookmark extraction after selecting the BOX function. Like those that are displayed after the scan function is selected, each of the setting screens shown in FIGS. 19A and 19B includes the field 71 for designating a way of bookmark extraction and the format setting field 72. In the setting screen shown in FIG. 19A, "AUTOMATIC" is selected as a way of bookmark extraction. When a format 39 associated with the logged-in user "A" is not stored in the storage device 36 of the image processing device 1, and when a format 39 associated with the file name "Report07.pdf" as one of attributes of document data is not stored in the storage device 36 of the image processing device 1, for example, "AUTOMATIC" is set as a default. Then, the user orders extraction of character strings in the first way by operating an OK key 73.

In the setting screen shown in FIG. 19B, bookmark extraction employing a format 39 that corresponds to the above-described second way is selected as a way of bookmark extraction. In the setting screen of FIG. 19B, "Format_Report_" associated with the file name "Report07.pdf" that is one of attributes of document data is set as a format 39 to be applied. When the file name of the document data 40 selected as a target of bookmark extraction contains "Report", for example, "Format_Report" is selected as a default as a format 39 associated with a file name containing "Report" from multiple formats 39 stored in the storage device 36 of the image processing device 1. Then, the user orders extraction of character strings with applying the format 39 corresponding to "Format_Report" by operating an OK key 73. When the user wishes to change the format to be applied, or when the user wishes to change the way of bookmark extraction to "AUTOMATIC," the user can make a desirable change by making the same operation as that described above on the screen of FIG. 19B.

Figure 13:
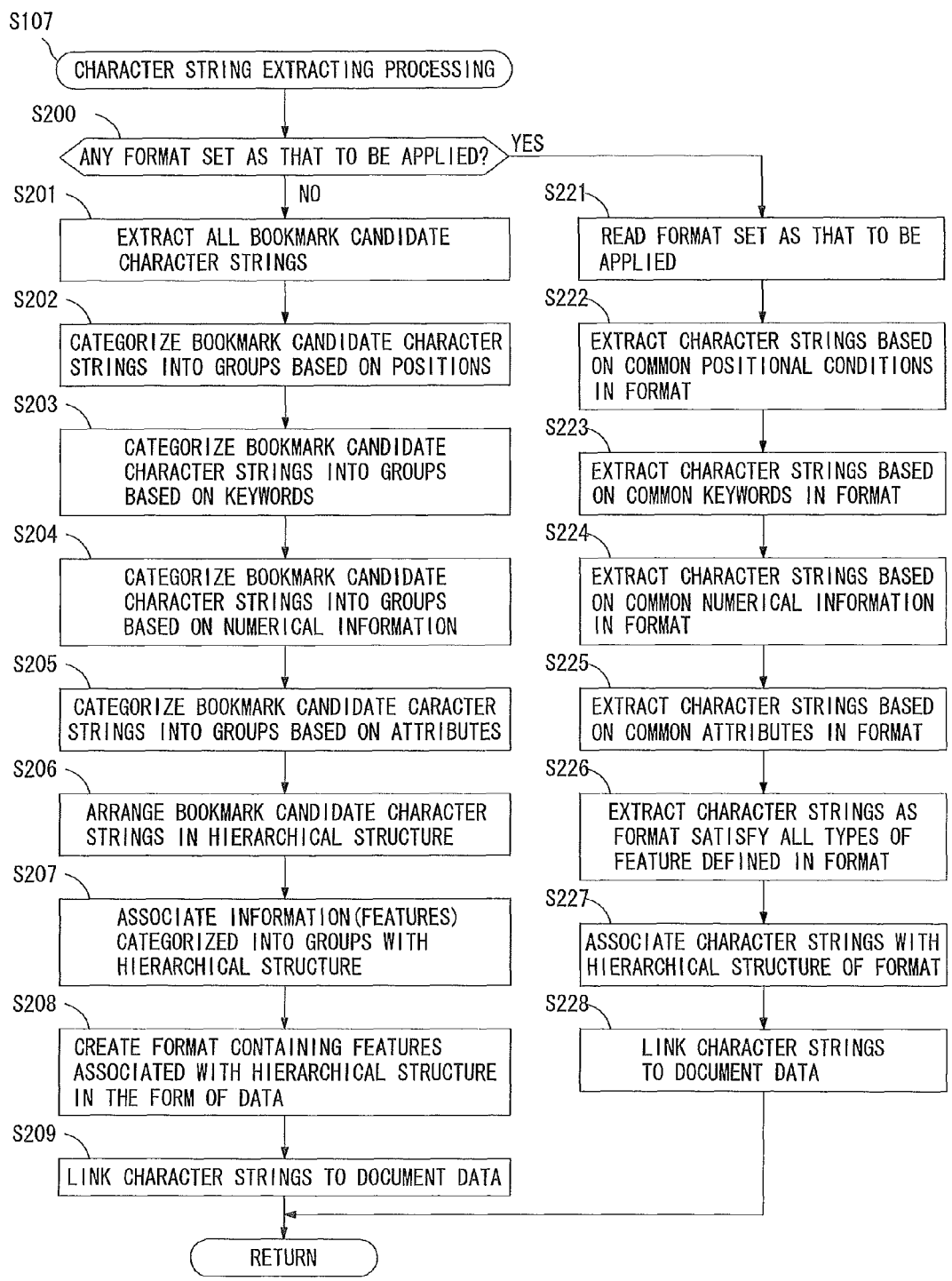
FIG. 13 is a flow diagram explaining in detail an exemplary procedure of a character string extracting process.

After the user specifies the way of character string extraction, the image processing device 1 proceeds to a character string extracting processing (step S107). FIG. 13 is a flow diagram explaining in detail an exemplary procedure of the character string extracting processing. The image processing device 1 determines which way should be used for bookmark extraction, and determines whether or not setting of a format to be applied is made (step S200). When no format 39 is set as the format to be applied (when a result of step S200 is NO), the flow goes to step S201. In contrast, the flow goes to step S221 when a format 39 is set as the format to be applied (when a result of step S200 is YES).

Steps S201 to S209 correspond to the character string extracting processing in the first way. First, the character string extracting processing in the first way is described. The image processing device 1 extracts all character strings as candidates for a bookmark from the acquired document data 40 that satisfy a predetermined condition for character string extraction (step S201). Here, character strings that satisfy a condition for character string extraction defined in advance in the program 37 are all extracted.

Next, based on the respective positions of the bookmark candidate character strings extracted in step S201, the image processing device 1 categorizes the bookmark candidate character strings into groups (step S202). Here, respective positions of the extracted bookmark candidate character strings exist in a document are specified. When there is commonality among respective positions of two or more character strings, these character strings are categorized into one group.

The image processing device 1 thereafter derives respective portions as keywords from the bookmark candidate character strings extracted in step S201, and categorizes the bookmark candidate character strings into groups based on the derived keywords (step S203). As an example, keywords such as "chapter" and "section" defined in advance may be derived. As another example, respective portions each including at least one letter may automatically be derived from the bookmark candidate character strings. In this case, the suitability of each of the derived portion as a keyword is evaluated, and the portion with evaluated suitability level not less than a certain level is set as a keyword. After respective keywords are derived from the bookmark candidate character strings, the bookmark candidate character strings are categorized into groups for each common keyword.

The image processing device 1 thereafter derives respective numerical information from the bookmark candidate character strings extracted in step S201, and categorizes the bookmark candidate character strings into groups based on the derived numerical information (step S204). As an example, numerical information is derived from several initial letters as a target of extraction of numerical information in each of the bookmark candidate character strings. Then, the bookmark candidate character strings are categorized into groups each having the common number of dots when the derived numerical information includes marks such as dots between numbers.

The image processing device 1 thereafter categorizes the bookmark candidate character strings extracted in step S201 into groups based on the respective attributes of the bookmark candidate character strings (step S205). Here, the respective attributes of the bookmark candidate character strings such as fonts are determined, and the bookmark candidate character strings are categorized into groups each having a common attribute.

As a result of the above-described processing in steps S202 to S205, one set of groups for each of the four types of features is obtained from the bookmark candidate character strings extracted in step S201. The image processing device 1 arranges the bookmark candidate character strings in a hierarchical structure based on at least one of the four types of features for which the groups of the bookmark candidate character strings are obtained (step S206). As an example, an indentation differs among the groups into which the bookmark candidate character strings are categorized based on their respective features regarding positions. Then, the groups are arranged in the hierarchical structure according to the respective indentations of the groups. Then, the bookmark candidate character strings are associated with the hierarchical structure, thereby arranging the bookmark candidate character strings into the hierarchical structure.

The image processing device 1 thereafter associates the respective features categorized into the groups with the hierarchical structure, thereby arranging two or more groups obtained with respect to each of the four types of features into the hierarchical structure (step S207).

Next, the image processing device 1 creates a format 39 that contains the respective features of the groups arranged in the hierarchical structure in the form of data (step S208). More specifically, the format creating part 46 generates the above-described common positional condition information, common keyword information, common numerical information, and common attribute information for each hierarchical level based on a feature shared in common in each group associated with the hierarchical structure, thereby creating the format 39.

Finally, the image processing device 1 links the character strings extracted as bookmark candidates to the document data 40 (step S209). In this linking processing, each character string as a bookmark candidate is given positional information indicating a position where the character string exists in the document data 40.

Steps S221 to S228 correspond to the character string extracting processing in the second way. The character string extracting processing in the second way is described next. First, the image processing device 1 reads the format 39 set as a format to be applied from the storage device 36 (step S221). Then, the image processing device 1 extracts character strings based on the common positional conditions defined in the read format 39 as read (step S222). Here, character strings satisfying common positional condition information defined for each hierarchical level of the format 39 are all extracted from the document data 40.

The image processing device 1 thereafter extracts character strings based on the common keywords defined in the format 39 (step S223). Here, character strings satisfying keyword information defined for each hierarchical level of the format 39 are all extracted from the document data 40.

The image processing device 1 thereafter extracts character strings based on the common numerical information defined in the format 39 (step S224). Here, character strings satisfying common numerical information defined for each hierarchical level of the format 39 are all extracted from the document data 40.

The image processing device 1 further extracts character strings based on the common attributes defined in the format 39 (step S225). Here, character strings satisfying common attribute information defined for each hierarchical level of the format 39 are all extracted from the document data 40.

As a result of the above-described processing in steps S222 to S225, character strings satisfying at least one of the common positional condition information, common keyword information, common numerical information, and common attribute information defined in the format 39 read in step S221 are all extracted. Next, in order to reduce those character strings as bookmark candidates in the extracted character strings, the image processing device 1 further extracts those character strings that satisfy all types of features defined in the format 39 as bookmark candidates (step S226). More specifically, only character strings that satisfy all of the common positional condition information, common keyword information, common numerical information, and common attribute information defined in the format 39 read in step 221 are extracted for each hierarchical level. Only the character strings extracted here become bookmark candidates.

Next, the image processing device 1 associates each of the character strings extracted as bookmark candidates to the hierarchical structure of the format 39 (step S227), thereby arranging the character strings extracted as bookmark candidates in the hierarchical structure. Finally, the image processing device 1 links the character strings extracted as bookmark candidates to the document data 40 (step S228). This linking processing is the same as that performed in step S209.

Returning to FIG. 12, after extracting the character strings as bookmark candidates in the character string extracting processing (step S107), the image processing device 1 displays a result of the character string extraction on the display device 20 (step S108). At this time, the screen shown in FIG. 7 is displayed on the display device 20, for example, and the detail of the format 39 responsive to the character string extracting processing is displayed in the bookmark format display field 51. More specifically, the detail of the format 39 created in step S208 of FIG. 13 is displayed when the character strings are extracted in the first way. The detail of the format 39 read in step S221 of FIG. 13 is displayed when the character strings are extracted in the second way.

The user checks the displayed result of the character string extraction, and proceeds to an editing operation with the mouse 21 and the like to correct the format 39 when the result of the character string extraction fails to satisfy a user's desire. In contrast, the user does not proceed to the editing operation of the format 39 when the result of the character string extraction satisfies the user's desire.

After displaying the result of the character string extraction, the image processing device 1 determines whether or not the user has made the editing operation of the format 39 (step S109). When the user has made the editing operation (when a result of step S109 is YES), the image processing device 1 proceeds to a format editing processing (step S110).

Figure 14:
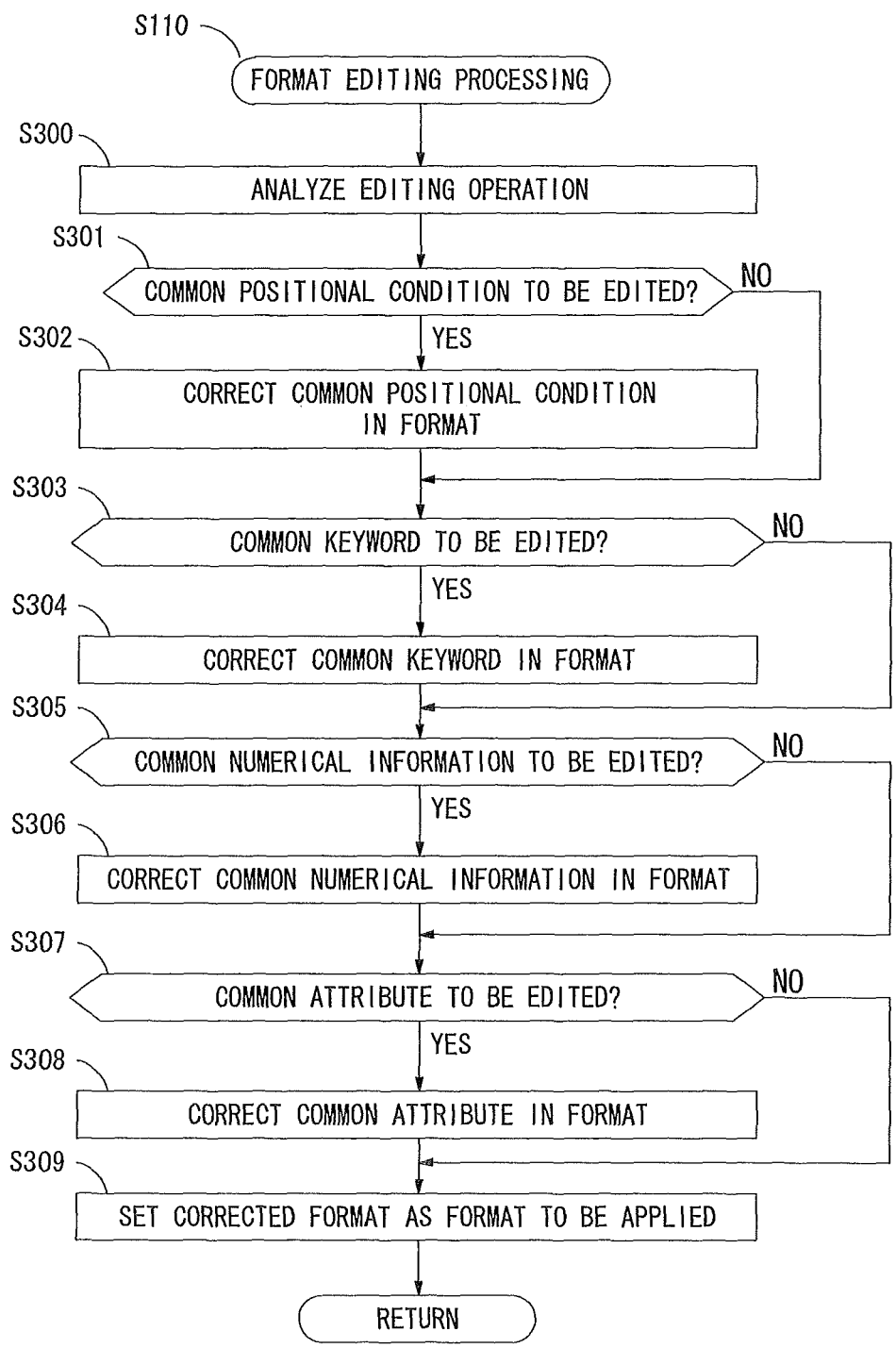
FIG. 14 a flow diagram explaining in detail an exemplary procedure of a format editing process.

FIG. 14 a flow diagram explaining in detail an exemplary procedure of the format editing processing (step S110). First, the image processing device 1 analyzes the editing operation made by the user (step S300).

When the editing operation is intended to correct the common positional condition in the format 39 (when a result of step S301 is YES), the image processing device 1 corrects the common positional condition information defined in the format 39 (step S302) according to the user's operation. In contrast, the image processing device 1 bypasses step S302 when the editing operation is not intended to correct the common positional condition in the format 39 (when a result of step S301 is NO).

When the editing operation is intended to correct the common keyword in the format 39 (when a result of step S303 is YES), the image processing device 1 corrects the common keyword information defined in the format 39 (step S304) according to the user's operation. In contrast, the image processing device 1 bypasses step S304 when the editing operation is not intended to correct the common keyword in the format 39 (when a result of step S303 is NO).

When the editing operation is intended to correct the common numerical information in the format 39 (when a result of step S305 is YES), the image processing device 1 corrects the common numerical information defined in the format 39 (step S306) according to the user's operation. In contrast, the image processing device 1 bypasses step S306 when the editing operation is not intended to correct the common numerical information in the format 39 (when a result of step S305 is NO).

When the editing operation is intended to correct the common attribute in the format 39 (when a result of step S307 is YES), the image processing device 1 corrects the common attribute information defined in the format 39 (step S308) according to the user's operation. In contrast, the image processing device 1 bypasses step S308 when the editing operation is not intended to correct the common attribute in the format 39 (when a result of step S307 is NO).

After performing the above-described editing processing of the format 39 in response to the user's editing operation, the image processing device 1 sets the corrected format 39 as another format 39 (step S309) to be applied for subsequent character string extraction.

Then, the flow returns to the character string extracting processing (step S107) as shown in FIG. 12 in which character strings as bookmark candidates are extracted again based on the corrected format 39. This extraction of character strings (step S107) is realized by following the character string extracting processing in the second way shown in steps S221 to S228 of FIG. 13. After the character strings are extracted again, the display screen on the display device 20 is updated (step S108).

When the editing operation of the format 39 is not made by the user (when a result of step S109 is NO), the image processing device 1 generates bookmark data of the hierarchical structure based on the character strings extracted in the character string extracting processing (step S107), and adds the bookmark data to the document data 40 (step S111). So, for using the document data 40, the bookmark data can be referred, by which the convenience in the use of the document data 40 is enhanced.

The image processing device 1 thereafter saves the format 39 finally fixed to the storage device 36 (step S112). At this time, the image processing device 1 enters information of the logged-in user in association with the format 39, and information of the attribute of the document data 40 in association with the format 39 in the format management table 39*a*.

As described, in the preferred embodiment, the image processing device 1 functions as a document processing device. So, character strings such as headings are extracted as bookmark candidates from the document data 40 as a target of bookmark extraction. In this extraction, the image processing device 1 derives features shared in common among the character strings extracted as bookmark candidates, and creates a format 39 containing the common features in the form of data. The image processing device 1 also displays the character strings in a list form extracted as bookmark candidates and the format 39 in the form of data on the display device 20, and receives a user's operation for correction of the format 39. The image processing device 1 corrects the format 39 based on the user's operation for correction, and extracts character strings again to conform to the corrected format 39.

Even when a character string a user intended is not extracted as a bookmark candidate, the user makes an operation to correct the common positional condition information, the common keyword information, the common numerical information, or the common attribute information in each hierarchical level with seeing the detail of a format 39 displayed on the display device 20. So, character strings to be bookmark candidates are extracted again in response to the user's operation, by which a result of character string extraction displayed on the display device 20 is updated. This simplifies the user's operation to correct the result of character string extraction as compared to that in the conventional technique. As a result, character strings as the user intended are efficiently extracted as a bookmark.

In the preferred embodiment, a format 39 created during the course of the character string extracting processing is stored in the storage device 36. So, when selecting different documents and trying to extract the respective bookmarks therefrom, a user sets the format 39 previously applied as a format to be applied each time for subsequent character string extraction, and then provides instructions for the character string extracting processing in the second way. This reduces the number of user's operations for correction.

So, according to the document processing device described as an example of the preferred embodiment, character strings satisfying a predetermined condition for character string extraction are extracted from document data, the respective features of the character strings are derived, and a format containing the features in the form of data is created. The extracted character strings are displayed in a list form together with the format that is created based on the respective features of the character strings. The correction made to the format is received, and performed. Character strings are extracted again to conform to the corrected format. Even when a character string failing to satisfy a user is extracted as a bookmark candidate, the user makes an operation accordingly to correct the format containing the respective features of the character strings. So, character strings are extracted again to conform to the corrected format, by which character strings satisfying the user are efficiently extracted.

While the preferred embodiment of the present invention has been described above, the present invention is not intended to be limited to the details shown above. Numerous modifications and variations can be devised without departing from the scope of the invention.

As an example, in the preferred embodiment described above, the format 39 is created by deriving common features for bookmark candidate character strings extracted in the first way. After creation of the format 39, bookmark candidate character strings are extracted in the second way with the created format 39. In other words, the first way is only for extracting bookmark candidate character strings from the document data 40. So, the substance of the first way is not intended to be limited to that described above.

By way of example, the image processing device 1 includes, in addition to the operational panel 17, the display device 20 on which information such as results of character string extraction are displayed. The reason to provide the display device 20 is that the display unit 15 of the operational panel 17 is a low-resolution display, and is considered to be unsuitable for properly displaying information such as a preview image of a document based on document data 40 and the detail of a format 39. So, when the display unit 15 of the operational panel 17 has a satisfactory display resolution, information such as a preview image of a document based on document data 40 and the detail of a format 39 may be displayed on the display unit 15 without providing the display device 20.

In the preferred embodiment described above, common features to be derived from character strings extracted as bookmark candidates are those relating to the four types of features including the common positional condition information, common keyword information, common numerical information, and common attribute information. However, features of other types may be derived.

In the preferred embodiment described above, the image processing device 1 mainly functions as a document processing device. In order for the computer 3 to function as a document processing device alternatively, the program 37 for executing the procedure explained in the flow diagram of FIG. 12 may be installed on the computer 3 to cause the computer 3 to execute the procedure based on FIG. 12. In this case, the program 37 may be provided in the form of data stored in a recording medium such as a CD-ROM.

What is claimed is:

1. A document processing device comprising:
    a document data acquiring part for acquiring document data;
    a character string extracting part for extracting character strings that correspond to at least one of a heading, a title, or a subtitle as bookmark candidate character strings from said document data acquired by said document data acquiring part;
    a format creating part for deriving respective features of said bookmark candidate character strings extracted by said character string extracting part, categorizing said bookmark candidate character strings having a common feature into one group, and creating a format for the group based on the common feature of the group;
    a display part on which said bookmark candidate character strings extracted by said character string extracting part are displayed in a list form, and on which the format corresponding to said bookmark candidate character strings created by said format creating part is displayed; and
    a format correcting part for receiving a correcting operation of a user given to the format displayed on said display part and correcting the format in response to the correcting operation, wherein
    said character string extracting part extracts the character strings again that have the common feature of the format corrected by said format correcting part from said document data as said bookmark candidate character strings.

2. The document processing device according to claim 1, wherein
    said format creating part arranges the respective features of character strings in a hierarchical structure based on features shared in common among said character strings; and
    said character strings extracted by said character string extracting part are associated with said hierarchical structure and displayed on said display part.

3. The document processing device according to claim 1, wherein the features of each of said character strings derived by said format creating part include a positional condition indicating a range of the character string from a reference position in a document.

4. The document processing device according to claim 3, wherein
    said format correcting part receives an operation to correct a positional condition indicating a range from a reference position in a document displayed on said display part, and corrects information contained in the format based on said operation, and
    said character string extracting part extracts the character strings again to conform to said information in the format corrected by said format correcting part.

5. The document processing device according to claim 1, wherein the features of each of said character strings derived by said format creating part include a keyword contained in the character string.

6. The document processing device according to claim 1, wherein the features of each of said character strings derived by said format creating part include numerical information contained in the character string.

7. The document processing device according to claim 1, wherein the features of each of said character strings derived by said format creating part include an attribute of the character string.

8. The document processing device according to claim 1, further comprising a storage part for storing therein the format created by said format creating part, or the format corrected by said format correcting part, wherein
said character string extracting part reads the format from said storage part, and extracts the character strings from the document data to conform to the read format.

9. The document processing device according to claim 8, wherein
said storage part stores therein the format associated with each user, and
said character string extracting part reads the format associated with a user who orders extraction of the character strings from said storage part, and extracts the character strings from the document data to conform to the read format.

10. The document processing device according to claim 8, wherein
the format stored in said storage part is associated with an attribute of the document data, and
said character string extracting part reads the format from said storage part based on the attribute of said document data acquired by said document data acquiring part, and extracts character strings from the document data to conform to the read format.

11. The document processing device according to claim 1, wherein
a preview image of a document based on said document data acquired by said document data acquiring part is also displayed on said display part, and
each of said character strings in the list form and each character strings contained in said preview image are displayed as being linked to each other on said display part.

12. The document processing device according to claim 1, wherein said document data acquiring part includes a character recognizing part for converting received image data to the document data in text format by performing a character recognizing processing on said received image data.

13. A document processing method, comprising the steps of:
(a) acquiring document data;
(b) extracting character strings that correspond to at least one of a heading, a title, or a subtitle as bookmark candidate character strings from the acquired document data;
(c) deriving respective features of the extracted bookmark candidate character strings, and categorizing said bookmark candidate character strings having a common feature into one group and creating a format for the group based on the common feature of the group;
(d) displaying said extracted bookmark candidate character strings in a list form, and displaying the format corresponding to said bookmark candidate character strings;
(e) correcting the format in response to receiving a correcting operation given to the displayed format from a user;
(f) when the format is corrected, extracting the character strings again that have the common featured of the corrected format from the acquired document data as said bookmark's candidate character strings; and
(g) generating bookmark data based on said character strings extracted from the acquired document data and adding the generated bookmark data to the acquired document data.

14. The document processing method according to claim 13, wherein
in said step (c), the respective features of character strings are arranged in a hierarchical structure based on features shared in common among said character strings, and
in said step (d), said character strings extracted in said step (b) are associated with said hierarchical structure and displayed.

15. The document processing method according to claim 13, wherein the features of each of said character strings derived in said step (c) include a positional condition indicating a range of the character string from a reference position in a document.

16. The document processing method according to claim 13, wherein the features of each of said character strings derived in said step (c) include a keyword contained in the character string.

17. The document processing method according to claim 13, wherein the features of each of said character strings derived in said step (c) include numerical information contained in the character string.

18. The document processing method according to claim 13, wherein the features of each of said character strings derived in said step (c) include an attribute contained in the character string.

19. The document processing method according to claim 13, further comprising the step of:
(h) storing the format created in said step (c), or the format corrected in said step (e), wherein
in said step (b), the format stored in said step (h) is read, and the character strings are extracted from the acquired document data to conform to the read format.

20. A non-transitory computer-readable recording medium on which a program is recorded, said program causing a computer to operate as a system comprising:
a document data acquiring part for acquiring document data;
a character string extracting part for extracting character strings that correspond to at least one of a heading, a title, or a subtitle as bookmark candidate character strings from said document data acquired by said document data acquiring part;
a format creating part for deriving respective features of said bookmark candidate character strings extracted by said character string extracting part, categorizing said bookmark candidate character strings having a common feature into one group, and creating a format based on the common feature of the group;
a display part on which said bookmark candidate character strings extracted by said character string extracting part are displayed in a list form, and on which the format corresponding to said bookmark candidate character strings created by the format creating part is displayed;
a format correcting part for receiving a correcting operation of a user given to the format displayed on said display part and correcting said format in response to the correcting operation; and
said program causing said character string extracting part to extract the character strings again that have the common feature of the format corrected by said format correcting part from said document data as said bookmark candidate character strings.

* * * * *